(12) United States Patent
Huo et al.

(10) Patent No.: US 12,537,939 B2
(45) Date of Patent: *Jan. 27, 2026

(54) IMAGE COMPONENT PREDICTION METHOD AND DEVICE, AND COMPUTER STORAGE MEDIUM

(71) Applicant: GUANGDONG OPPO MOBILE TELECOMMUNICATIONS CORP., LTD., Guangdong (CN)

(72) Inventors: Junyan Huo, Dongguan (CN); Yanzhuo Ma, Dongguan (CN); Shuai Wan, Dongguan (CN); Fuzheng Yang, Dongguan (CN); Xinwei Li, Dongguan (CN); Qihong Ran, Dongguan (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 18 days.

This patent is subject to a terminal disclaimer.

(21) Appl. No.: 18/622,202

(22) Filed: Mar. 29, 2024

(65) Prior Publication Data

US 2024/0244186 A1  Jul. 18, 2024

Related U.S. Application Data

(63) Continuation of application No. 17/723,179, filed on Apr. 18, 2022, now Pat. No. 11,973,936, which is a
(Continued)

(51) Int. Cl.
*H04N 19/105* (2014.01)
*H04N 19/176* (2014.01)
*H04N 19/186* (2014.01)

(52) U.S. Cl.
CPC ......... *H04N 19/105* (2014.11); *H04N 19/176* (2014.11); *H04N 19/186* (2014.11)

(58) Field of Classification Search
None
See application file for complete search history.

(56) References Cited

U.S. PATENT DOCUMENTS

| 2013/0114706 A1 | 5/2013 | Gisquet |
| 2017/0150186 A1 | 5/2017 | Zhang |
(Continued)

FOREIGN PATENT DOCUMENTS

| CN | 101816182 A | 8/2010 |
| CN | 102209243 A | 10/2011 |
(Continued)

OTHER PUBLICATIONS

Chen et al., Algorithm description for Versatile Video Coding and Test Model 5 (VTM 5), JVET-N1002-v2, 14th Meeting: Geneva, CH, Mar. 2019. (Provided in parent case).*
(Continued)

*Primary Examiner* — Michael J Hess
(74) *Attorney, Agent, or Firm* — PERKINS COIE LLP

(57) ABSTRACT

Colour component prediction method is provided, which includes that: first reference sample set corresponding to colour component to be predicted of coding block in video image is acquired; when available sample number in first reference sample set is less than preset number, preset component value is taken as predicted value corresponding to the colour component to be predicted; when available sample number in first reference sample set is not less than preset number, first reference sample set is screened to obtain second reference sample set; when available sample number in second reference sample set is equal to preset number, model parameter is determined through second reference sample set, and prediction model corresponding to colour component to be predicted is obtained based on model parameter, prediction model is used for prediction processing of colour component to be predicted to obtain
(Continued)

predicted value corresponding to colour component to be predicted.

20 Claims, 22 Drawing Sheets

Related U.S. Application Data continuation of application No. 17/452,682, filed on Oct. 28, 2021, now Pat. No. 11,363,257, which is a continuation of application No. PCT/CN2019/092711, filed on Jun. 25, 2019.

(56) References Cited

U.S. PATENT DOCUMENTS

| | | | |
|---|---|---|---|
| 2017/0366818 A1 | 12/2017 | Zhang | |
| 2018/0205946 A1 | 7/2018 | Zhang | |
| 2018/0376151 A1 | 12/2018 | Begaint | |
| 2019/0068969 A1 | 2/2019 | Rusanovskyy | |
| 2019/0149838 A1 | 5/2019 | Zhang | |
| 2020/0288135 A1* | 9/2020 | Laroche | H04N 19/105 |
| 2020/0413069 A1* | 12/2020 | Lim | H04N 19/197 |
| 2021/0051342 A1* | 2/2021 | Galpin | H04N 19/147 |
| 2021/0243457 A1* | 8/2021 | Ahn | H04N 19/11 |

FOREIGN PATENT DOCUMENTS

| | | |
|---|---|---|
| CN | 103379321 A | 10/2013 |
| CN | 103609114 A | 2/2014 |
| CN | 104871537 A | 8/2015 |
| CN | 105306944 A | 2/2016 |
| CN | 105704491 A | 6/2016 |
| CN | 106664425 A | 5/2017 |
| CN | 109005408 A | 12/2018 |
| CN | 109076210 A | 12/2018 |
| CN | 109076237 A | 12/2018 |
| CN | 109196867 A | 1/2019 |
| CN | 109716771 A | 5/2019 |
| CN | 109905715 A | 6/2019 |
| GB | 2571311 B | 8/2021 |
| TW | 201921925 A | 6/2019 |
| WO | 2018053293 A1 | 3/2018 |
| WO | 2018118940 A1 | 6/2018 |
| WO | 2018132710 A1 | 7/2018 |

OTHER PUBLICATIONS

Choi et al., "CE3: Reduced number of reference samples for CCLM parameter calculation (CE3-1.4.1 and CE3-1.4.2)," JVET-N0228, 14th Meeting: Geneva, CH, Mar. 2019. (Provided in parent case).*
Choi et al., "CE3-related: Reduced number of reference samples for CCLM parameter calculation," JVET-M0219-v2, 13th Meeting, Marrakech, MA, Jan. 2019. (Provided in parent case).*
Wang et al., "CE3-related: Modified linear model derivation for CCLM modes," JVET-M0274, 13th Meeting, Marrakech, MA, Jan. 2019. (Provided in parent case).*
First Office Action of the Indonesian application No. P00202112271, issued on Jan. 23, 2024. 7 pages with English translation.
Supplementary European Search Report in the European application No. 24152839.7, mailed on Mar. 7, 2024. 10 pages.
Chen et al., "Algorithm description for Versatile Video Coding and Test Model 5 (VTM 5)," JVET-N1002-v2, 14th Meeting: Geneva, CH, Mar. 2019, the whole document. 76 pages.
Choi et al., "CE3: Reduced No. of reference samples for CCLM parameter calculation (CE3-1.4.1 and CE3-1.4.2)," JVET-N0228, 14th Meeting: Geneva, CH, Mar. 2019, the whole document. 20 pages.
Wang et al., "CE3-related: Modified linear model derivation for CCLM modes," JVET-M0274, 13th Meeting, Marrakech, MA, Jan. 2019, the whole document. 3 pages.
Non Final Office Action of the U.S. Appl. No. 17/723,179, issued on Aug. 1, 2023. 36 pages.
Notice of Allowance of the U.S. Appl. No. 17/723,179, issued on Dec. 28, 2023. 11 pages.
J. Choi, et al, Joint Video Experts Team (JVET) of ITU-T SG 16 WP 3 and ISO/IEC JTC 1/SC 29/WG 11, Document: JVET-M0219-v2, 13th Meeting: Marrakech, MA, Jan. 9-18, 2019, Title: CE3-related : Reduced number of reference samples for CCLM parameter calculation, Status: Input document to JVET. 4 pages.
First Office Action of the Chinese application No. 202111138344.5, issued on Nov. 24, 2022. 11 pages with English translation.
Written Opinion of the International Search Authority in the international application No. PCT/CN2019/092711, mailed on Mar. 23, 2020. 8 pages with English translation.
Kim et al., "Cross-Component Prediction in HEVC," IEEE Transactions on Circuits and Systems for Video Technology, Jan. 2015. 11 pages.
Xu et al., "Overview of the Emerging HEVC Screen Content Coding Extension," IEEE Transactions on Circuits and Systems for Video Technology, Jan. 2016. 14 pages.
Li et al., "Sub-sampled Cross-component Prediction for Emerging Video Coding Standards," Dec. 2020. 11 pages.
Notice of Allowance of the U.S. Appl. No. 17/452,682, issued on Mar. 8, 2022. 13 pages.
Jangwon Choi, wt al., CE3-related: Reduced number of reference samples for CCLM parameter calculation, Joint Video Experts Team (JVET) of ITU-T SG 16 WP 3 and ISO/IEC JTC 1/SC 29/WG 11, JVET-L0138-v2, 12th Meeting: Macao, CN, Oct. 3-12, 2018, pp. 1-5.5 pages.
Junyan Huo, et al., CE3-related: Fixed Reference Sampl es Design for CCLM, Joint Video Experts Team (JVET) of ITU-T SG 16 WP 3 and ISO/IEC JTC 1/SC 29/WG 11, JVET-M0211-v1, 13th Meeting: Marrakech, MA, Jan. 9-18, 2019, pp. 1-6. 7 pages.
First Office Action of the Japanese application No. 2021-576642, issued on Jun. 27, 2023. 6 pages with English translation.
Office Action of the Indian application No. 202117048185, issued on Apr. 21, 2022. 6 pages with English translation.
Chen J et al: "Algorithm description of Joint Exploration Test Model 7 (JEM7)", 7. JVET Meeting; Jul. 13, 2017-Jul. 21, 2017; Torino; (The Joint Video Exploration Team of ISO/IEC JTC1/SC29/WG11 and ITU-T SG.16), Jul. 13, 2017-Jul. 21, 2017; Torino, No. G1001_v1; JVET-G1001, Aug. 19, 2017 (Aug. 19, 2017), pp. 1-48 XP030150980. 48 pages.
Y-J Chiu (INTEL) et al: "Cross-channel techniques to improve intra chroma prediction", 6. JCT-VC Meeting; Jul. 14, 2011-Jul. 22, 2011; Torino; (Joint Collaborative Team on Video Coding of ISO/IEC JTC1/SC29/WG11 and ITU-TSG.16 ), No. JCTVC-F502, Jul. 18, 2011 (Jul. 18, 2011), XP030229128. 6 pages.
Zhang K et al: "Enhanced Cross-component Linear Model Intra-prediction", 4. JVET Meeting; Oct. 15, 2016-Oct. 21, 2016; Chengdu; (The Joint Video Exploration Team of ISO/IEC JTC1/SC29/WG11 and ITU-T SG.16 ); URL: http://phenix. int-evry.fr/jvet/, No. JVET-D0110-v4,Oct. 17, 2016 (Oct. 17, 2016), XP030150355,*paragraphs [0001], [0002]*. 6 pages.
Supplementary European Search Report in the European application No. 19934681.8, mailed on Jun. 30, 2022. 10 pages.
First Office Action of the European application No. 19934681.8, issued on Mar. 1, 2023. 6 pages.
International Search Report in the international application No. PCT/CN2019/092711, mailed on Mar. 23, 2020. 6 pages with English translation.
First Office Action of the Korean application No. 10-2021-7043312, issued on Dec. 19, 2024. 17 pages with English translation.
Hearing Notice of the Indian application No. 202117048185, issued on Nov. 11, 2025.
Junyan Huo et al., "Non-CE3: CCLM simplification", Joint Video Experts Team (JVET) of ITU-T SG 16 WP 3 and ISO/ IEC JTC 1/SC 29/WG 11, JVET-O0320, 15th Meeting: Gothenburg, SE, Jul. 3-12, 2019.
First Office Action of the Chinese application No. 201980091266.2, issued on Nov. 17, 2025.
Benjamin Bross et al, "Versatile Video Coding (Draft 5)", Joint Video Experts Team (JVET) of ITU-T SG 16 WP 3 and ISO/IEC

(56) References Cited

OTHER PUBLICATIONS

JTC 1/SC 29/WG 11, JVET-N1001-v8, 14th Meeting: Geneva, CH, Mar. 19-27, 2019, section 8.4.5.2.13.
First Office Action of the Chinese application No. 202310838522.8, issued on Nov. 14, 2025.

* cited by examiner

IMAGE COMPONENT PREDICTION METHOD AND DEVICE, AND COMPUTER STORAGE MEDIUM

CROSS-REFERENCE TO RELATED APPLICATION

This is a continuation application of U.S. patent application Ser. No. 17/723,179, entitled "IMAGE COMPONENT PREDICTION METHOD AND DEVICE, AND COMPUTER STORAGE MEDIUM" filed on Apr. 18, 2022, which is a continuation application of U.S. patent application Ser. No. 17/452,682, filed on Oct. 28, 2021, which is a continuation of International Patent Application No. PCT/CN2019/092711, filed on Jun. 25, 2019, the contents of which are hereby incorporated by reference in their entirety.

BACKGROUND

With the increasing requirements of people for video display quality, new video application forms such as high-definition and ultra-high-definition videos have emerged. Since H.265/High Efficiency Video Coding (HEVC) has been unable to meet the needs of rapid development of video applications, the Joint Video Exploration Team (JVET) proposed the next-generation video coding standard H.266/Versatile Video Coding (VVC), and its corresponding test model is a VVC reference software test model (VVC Test Model, VTM).

In VTM, a method for a colour component prediction based on a prediction model has been integrated at present, and via this prediction model, a chroma component can be predicted from a luma component of a current Coding Block (CB). However, when constructing the prediction model, due to the difference in the number of neighbouring reference samples used for model parameter derivation, not only additional processing is added, but also the computational complexity is increased.

SUMMARY

Embodiments of this disclosure relates to the field of video coding and decoding technologies, and in particular, to a method and device for a colour component prediction.

The technical solutions in the embodiments of this disclosure can be implemented as follows.

According to a first aspect, the embodiments of this disclosure provide a method for a colour component prediction, applied to decoder, which includes that:

a first reference sample set corresponding to a colour component to be predicted of a coding block in a video picture is determined;

when the number of available samples in the first reference sample set is equal to 0, a preset component value is taken as a prediction value corresponding to the colour component to be predicted;

when the number of the available samples in the first reference sample set is greater than or equal to 4, 4 reference samples from the first reference sample set is determined as a second reference sample set based on positions of reference samples in the first reference sample set; and a model parameter is determined according to the second reference sample set, and a prediction model corresponding to the colour component to be predicted is obtained according to the model parameter, where the prediction model is used to implement prediction processing of the colour component to be predicted to obtain the prediction value corresponding to the colour component to be predicted.

According to a second aspect, the embodiments of this disclosure provide a method for a colour component prediction, applied to encoder, which includes that:

a first reference sample set corresponding to a colour component to be predicted of a coding block in a video picture is determined;

when the number of available samples in the first reference sample set is equal to 0, a preset component value is taken as a prediction value corresponding to the colour component to be predicted;

when the number of the available samples in the first reference sample set is greater than or equal to 4, 4 reference samples from the first reference sample set is determined as a second reference sample set based on positions of reference samples in the first reference sample set; and a model parameter is determined according to the second reference sample set, and a prediction model corresponding to the colour component to be predicted is obtained according to the model parameter, where the prediction model is used to implement prediction processing of the colour component to be predicted to obtain the prediction value corresponding to the colour component to be predicted.

According to a third aspect, the embodiments of this disclosure provide a decoder, which includes a processor and a memory configured to store a computer program capable of running on the processor, wherein the processor is configured to:

determine a first reference sample set corresponding to a colour component to be predicted of a coding block in a video picture;

when the number of available samples in the first reference sample set is equal to 0, take a preset component value as a prediction value corresponding to the colour component to be predicted;

when the number of the available samples in the first reference sample set is greater than or equal to 4, determine 4 reference samples from the first reference sample set as a second reference sample set based on positions of reference samples in the first reference sample set; and determine a model parameter according to the second reference sample set, and obtain a prediction model corresponding to the colour component to be predicted according to the model parameter, where the prediction model is used to implement prediction processing of the colour component to be predicted to obtain the prediction value corresponding to the colour component to be predicted.

DETAILED DESCRIPTION

Figure 1:
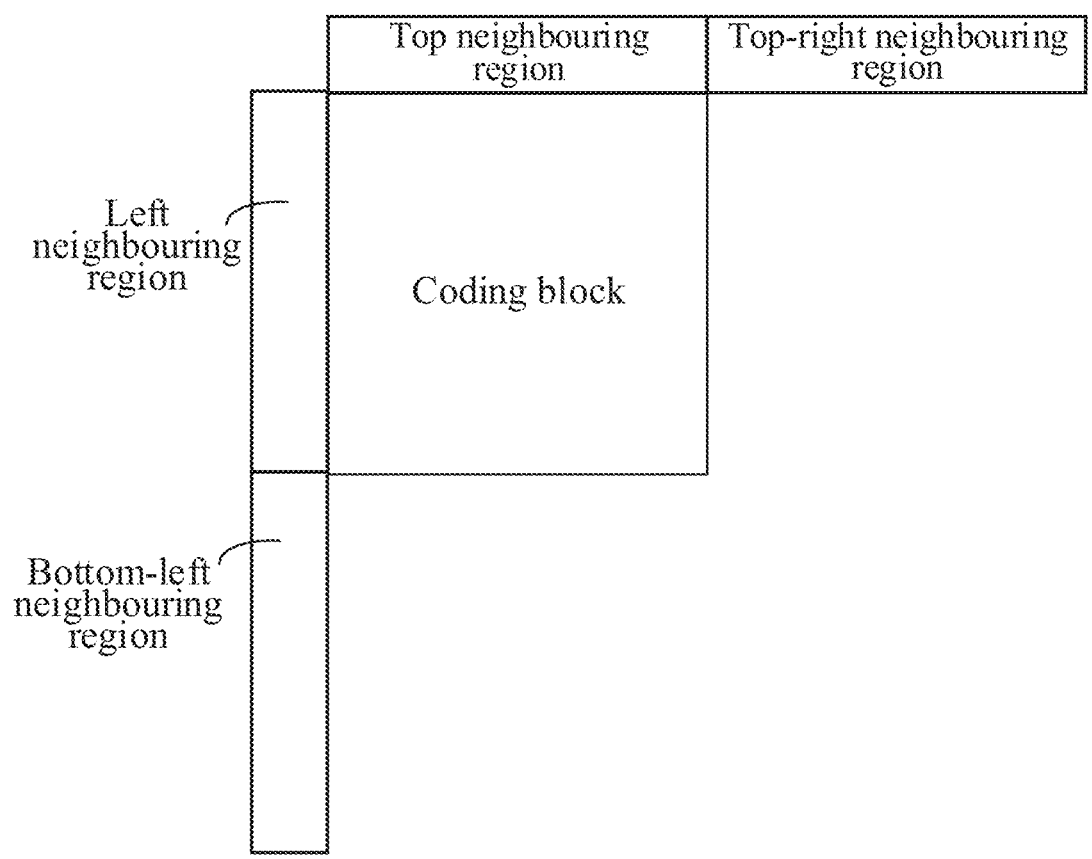
FIG. 1 is a schematic diagram of distribution of available neighbouring regions according to an embodiment of this disclosure.

In order to understand the characteristics and technical contents of the embodiments of this disclosure in more detail, the implementation of the embodiments of this disclosure is set forth in detail below with reference to the accompanying drawings, which are intended to be used for reference and illustration only, and are not intended to limit the embodiments of this disclosure.

In a video picture, a first colour component, a second colour component, and a third colour component are generally used to represent a coding block. The three colour components are a luma component, a blue chroma component, and a red chroma component, respectively. Specifically, the luma component is usually represented by a symbol Y, the blue chroma component is usually represented by a symbol Cb or U, and the red chroma component is usually represented by a symbol Cr or V. In this way, the video picture can be represented in a YCbCr format or in a YUV format.

In the embodiments of this disclosure, the first colour component may be the luma component, the second colour component may be the blue chroma component, and the third colour component may be the red chroma component. No specific limitation is made in the embodiments of this disclosure.

In a current video picture or video coding and decoding process, a cross-component prediction technology mainly includes a Cross-component Linear Model Prediction (CCLM) mode and a Multi-Directional Linear Model Prediction (MDLM) mode. Regardless of a model parameter derived according to the CCLM mode or a model parameter derived according to the MDLM mode, a prediction model corresponding thereto can realize prediction between colour components, such as prediction from the first colour component to the second colour component, the second colour component to the first colour component, the first colour component to the third colour component, the third colour component to the first colour component, the second colour component to the third colour component, or the third colour component to the second colour component.

Taking the prediction from the first colour component to the second colour component as an example, in order to reduce the redundancy between the first colour component and the second colour component, the CCLM mode is used in VVC. In this case, the first colour component and the second colour component are the same coding block, that is, a prediction value of the second colour component is constructed according to a reconstructed value of the first colour component of the same coding block, as represented by formula (1):

$$Pred_C[i, j] = \alpha \cdot Rec_L[i, j] + \beta \qquad (1)$$

where i, j represents position coordinates of a sample in the coding block, i represents a horizontal direction, j represents a vertical direction, $Pred_C[i, j]$ represents a prediction value of a second colour component corresponding to the sample whose position coordinates are [i, j] in the coding block, $Rec_L[i, j]$ represents a reconstructed value of a first colour component corresponding to the sample whose position coordinates are [i, j] in the same coding block (after down-sampling), and $\alpha$ and $\beta$ represent model parameters.

For the coding block, neighbouring regions thereof may include a left neighbouring region, a top neighbouring region, a bottom-left neighbouring region, and a top-right neighbouring region. In VVC, three cross-component linear model prediction modes may be included, which are a left neighbouring intra CCLM mode and top neighbouring intra CCLM mode (which can be represented by an INTRA_LT_CCLM mode), a left neighbouring intra CCLM mode and bottom-left neighbouring intra CCLM mode (which can be represented by an INTRA_L_CCLM mode), and a top neighbouring intra CCLM mode and top-right neighbouring intra CCLM mode (which can be represented by an INTRA_T_CCLM mode), respectively. In the three modes, a preset number (such as 4) of neighbouring reference samples can be chosen in each mode for the derivation of model parameters α and β. The biggest difference among the three modes is that selection regions corresponding to the neighbouring reference samples for deriving the model parameters α and β are different.

Specifically, for the size of the coding block corresponding to the second colour component to be W×H, it is assumed that the top selection region corresponding to the neighbouring reference sample is W', and the left selection region corresponding to the neighbouring reference sample is H'. In this way, for the INTRA_LT_CCLM mode, the neighbouring reference sample can be selected in the top neighbouring region and the left neighbouring region, i.e., W'=W, and H'=H;

for the INTRA_L_CCLM mode, the neighbouring reference sample can be selected in the left neighbouring region and the bottom-left neighbouring region, i.e., H'=W+H, and let W'=0; and for the INTRA_T_CCLM mode, the neighbouring reference sample can be selected in the top neighbouring region and the top-right neighbouring region, i.e., W'=W+H, and let H'=0.

It is to be noted that in the latest VVC reference software VTM5.0, for the top-right neighbouring region, only samples in a W range are stored at most, and for the bottom-left neighbouring region, only samples in an H range are stored at most. Therefore, although the range of the selection regions for the INTRA_L_CCLM mode and the INTRA_T_CCLM mode is defined as W+H, in practical applications, the selection regions for the INTRA_L_CCLM mode are limited to H+H, and the selection regions for the INTRA_T_CCLM mode are limited to W+W. In this way, for the INTRA_L_CCLM mode, the neighbouring reference sample can be selected in the left neighbouring region and the bottom-left neighbouring region, $$H' = \min\{W + H, H + H\};$$

and for the INTRA_T_CCLM mode, the neighbouring reference sample can be selected in the top neighbouring region and the top-right neighbouring region, $$W' = \min\{W + H, W + W\}.$$

Figure 2:
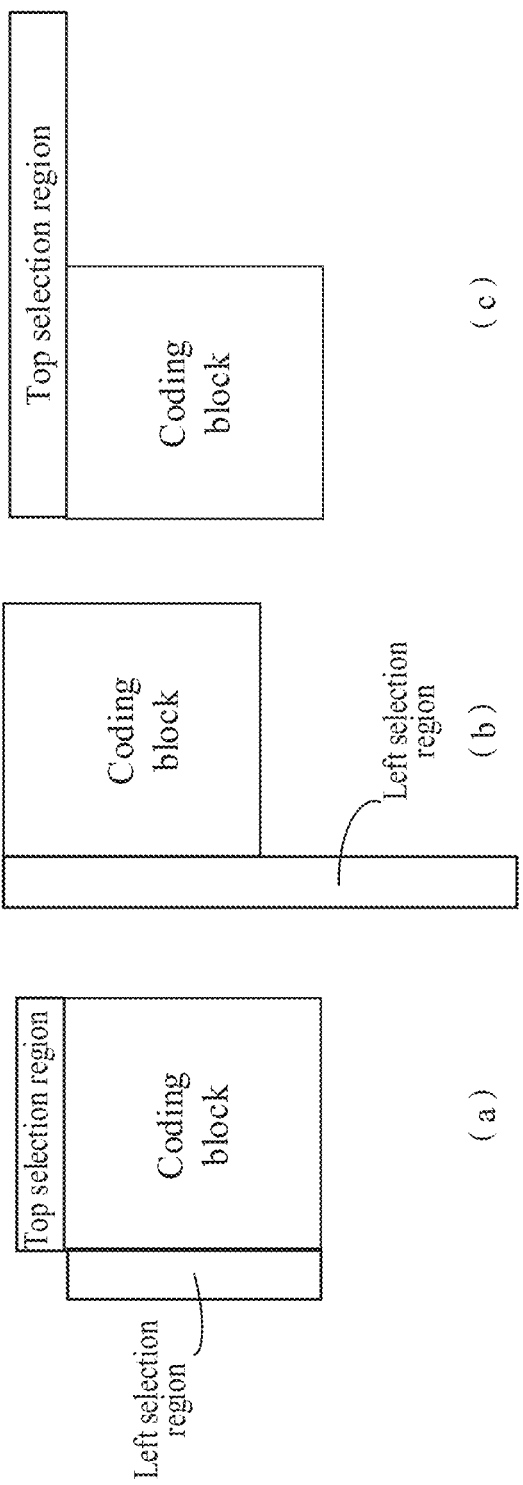
FIG. 2 is a schematic diagram of distribution of selection regions in three modes according to an embodiment of this disclosure.

Referring to FIG. 1, FIG. 1 is a schematic diagram of distribution of available neighbouring regions according to an embodiment of this disclosure. In FIG. 1, the left neighbouring region, the bottom-left neighbouring region, the top neighbouring region, and the top-right neighbouring region are all available. On the basis of FIG. 1, the selection regions for the three modes are shown in FIG. 2. In FIG. 2, (a) represents that the selection regions for the INTRA_LT_CCLM mode, including the left neighbouring region and the top neighbouring region; (b) represents the selection regions for the INTRA_L_CCLM mode, including the left neighbouring region and the bottom-left neighbouring region; (c) represents the selection regions for the INTRA_T_CCLM mode, including the top neighbouring region and the top-right neighbouring region. In this way, after the selection regions for the three modes are determined, reference points for model parameter derivation can be selected in the selection regions. Thus, the selected reference points can be called neighbouring reference samples, and usually, the number of the neighbouring reference samples is at most 4.

Moreover, for a coding block having a determined size of W×H, the positions of the neighbouring reference samples thereof are generally determined.

However, for some special cases, such as an side case of the coding block, an unpredictable case, and a case where a coding sequence leads to an inability to acquire the neighbouring reference samples, and even for a case where the coding block is partitioned according to tiles and slices, neighbouring regions may also be unavailable, resulting in that the number of neighbouring reference samples selected from the neighbouring regions is less than 4. That is, only zero or two neighbouring reference samples may be selected. As a result, the number of the neighbouring reference samples used for model parameter derivation is not uniform, thus an additional "copy" operation is added and the computational complexity is increased.

Without changing the coding and decoding prediction performance, in order to reduce the computational complexity while unifying the model parameter derivation processes, the embodiments of this disclosure provide a method for a colour component prediction. A first reference sample set corresponding to a colour component to be predicted of a coding block in a video picture is acquired; when the number of available samples in the first reference sample set is less than a preset number, a preset component value is taken as a prediction value corresponding to the colour component to be predicted; when the number of the available samples in the first reference sample set is greater than or equal to the preset number, the first reference sample set is screened to obtain a second reference sample set, where the number of available samples in the second reference sample set is less than or equal to the preset number; when the number of the available samples in the second reference sample set is less than the preset number, the preset component value is taken as the prediction value corresponding to the colour component to be predicted; and when the number of the available samples in the second reference sample set is equal to the preset number, a model parameter is determined through the first reference sample set, and a prediction model corresponding to the colour component to be predicted is obtained according to the model parameter, where the prediction model is used to implement prediction processing of the colour component to be predicted to obtain the prediction value corresponding to the colour component to be predicted. In this way, for the case where the number of the available samples in the first reference sample set is less than the preset number or the number of the available samples in the second reference sample set is less than the preset number, a CCLM mode is disabled, a preset default value is directly taken as the prediction value corresponding to the colour component to be predicted. Because no additional processing module is added, the computational complexity is also decreased. In addition, only when the number of the available samples in the second reference sample set is the preset number, the derivation of the model parameters is executed, that is, the CCLM mode is executed, thereby further unifying the model parameter derivation processes.

The following describes the embodiments of this disclosure in detail with reference to the accompanying drawings.

Figure 3:
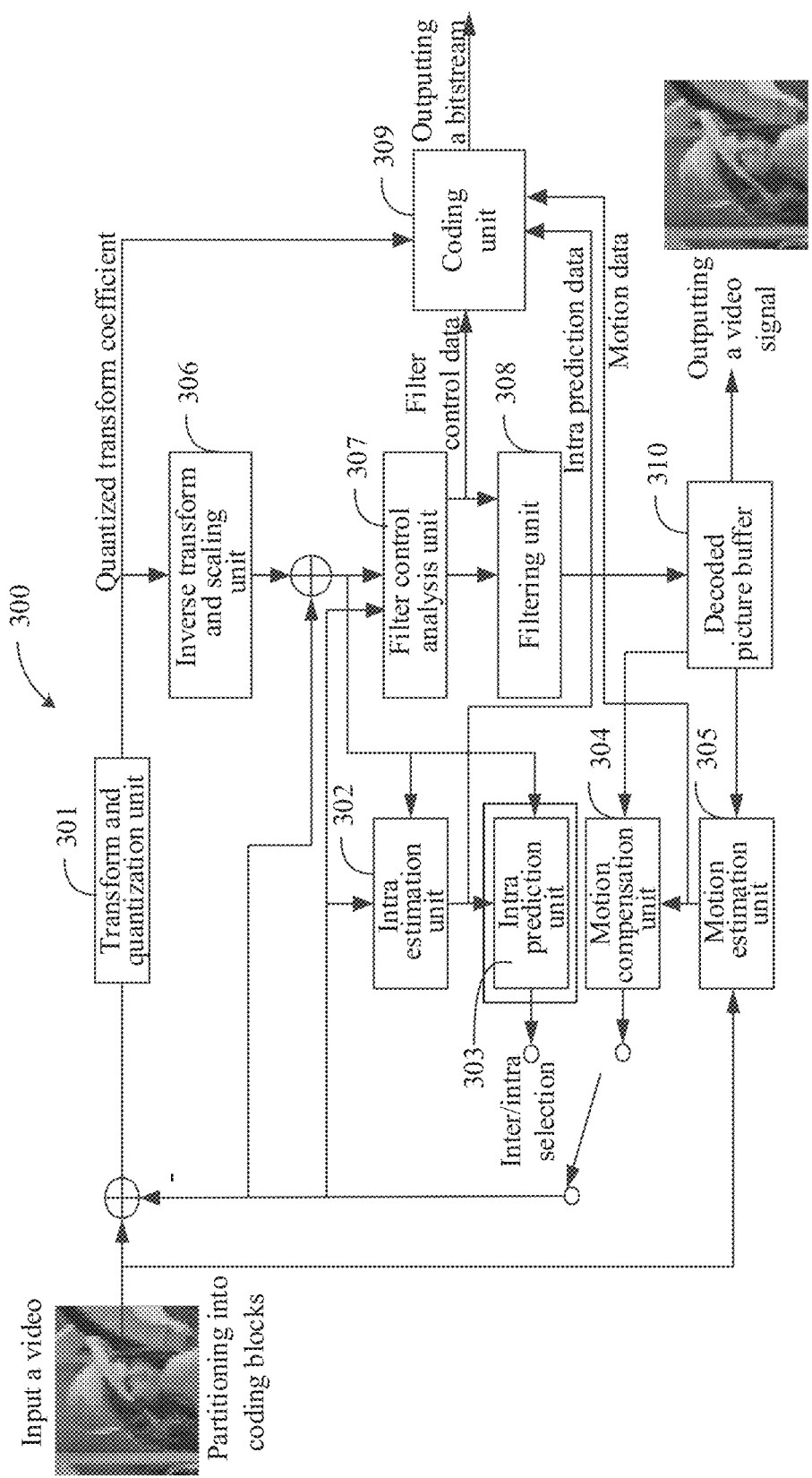
FIG. 3 is a schematic composition diagram of a video coding system according to an embodiment of this disclosure.

Referring to FIG. 3, FIG. 3 shows an example of a composition diagram of a video coding system according to an embodiment of this disclosure. As shown in FIG. 3, the video coding system 300 includes a transform and quantization unit 301, an intra estimation unit 302, an intra prediction unit 303, a motion compensation unit 304, a motion estimation unit 305, an inverse transform and scaling unit 306, a filter control analysis unit 307, a filtering unit 308, a coding unit 309, and a decoded picture buffer 310, etc. The filtering unit 308 can implement deblocking filtering and Sample Adaptive Offset (SAO) filtering. The coding unit 309 can implement header information coding and Context-based Adaptive Binary Arithmetic Coding (CABAC). For an inputted original video signal, a video coding block can be obtained by partitioning a Coding Tree Unit (CTU), then residual sample information obtained after intra or inter prediction is transformed by the transform and quantization unit 301 for the video coding block, including transforming the residual information from a sample domain to a transform domain, and the resulting transform coefficients are quantized to further reduce a bit rate. The intra estimation unit 302 and the intra prediction unit 303 are configured to perform intra prediction on the video coding block. Specifically, the intra estimation unit 302 and the intra prediction unit 303 are configured to determine an intra prediction mode to be used to code the video coding block. The motion compensation unit 304 and the motion estimation unit 305 are configured to perform inter prediction coding of the received video coding block relative to one or more blocks in one or more reference frames to provide time prediction information. The motion estimation performed by the motion estimation unit 305 is a process of generating a motion vector. The motion vector may be used to estimate the motion of the video coding block, and then the motion compensation unit 304 performs motion compensation based on the motion vector determined by the motion estimation unit 305. After determining the intra prediction mode, the intra prediction unit 303 is further configured to provide selected intra prediction data to the coding unit 309, and the motion estimation unit 305 also sends the motion vector data determined by calculation to the coding unit 309. In addition, the inverse transform and scaling unit 306 is configured to reconstruct the video coding block, and reconstruct a residual block in the sample domain. The reconstructed residual block removes block effect artifacts through the filter control analysis unit 307 and the filtering unit 308. The reconstructed residual block is then added to a predictive block in a frame of the decoded picture buffer 310 to generate a reconstructed video coding block. The coding unit 309 is configured to code various coding parameters and quantized transform coefficients. In a CABAC-based coding algorithm, context content can be based on neighbouring coding blocks, and can be used to code information indicating the determined intra prediction mode, and output a bitstream of the video signal. Moreover, the decoded picture buffer 310 is configured to store the reconstructed video coding block for prediction reference. As the video picture coding progresses, new reconstructed video coding blocks will be continuously generated. These reconstructed video coding blocks are all stored in the decoded picture buffer 310.

Figure 4:
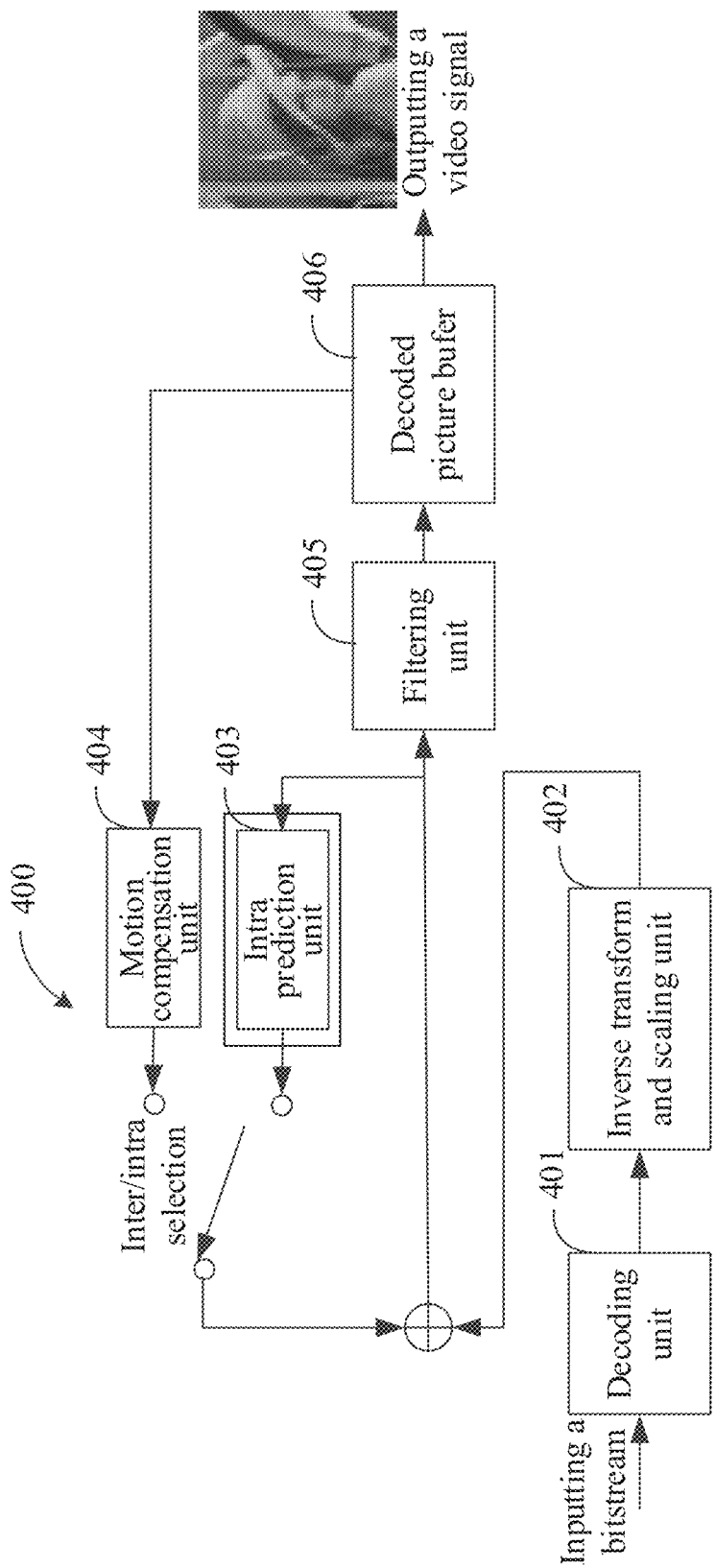
FIG. 4 is a schematic composition diagram of a video decoding system according to an embodiment of this disclosure.

Referring to FIG. 4, FIG. 4 shows an example of a composition diagram of a video decoding system according to an embodiment of this disclosure. As shown in FIG. 4, the video decoding system 400 includes a decoding unit 401, an inverse transform and scaling unit 402, an intra prediction unit 403, a motion compensation unit 404, a filtering unit 405, and a decoded picture buffer 406. The decoding unit 401 can implement header information decoding and CABAC decoding. The filtering unit 405 can implement deblocking filtering and SAO filtering. After an inputted video signal undergoes the coding process in FIG. 2, a bitstream of the video signal is outputted. The bitstream is inputted into the video decoding system 400, and first passes through the decoding unit 401 to obtain a decoded transform coefficient. The transform coefficient is processed by the inverse transform and scaling unit 402 to generate a residual block in the sample domain. The intra prediction unit 403 can be configured to generate prediction data of a current video decoding block based on the determined intra prediction mode and data from the previously decoded block of a current frame or picture. The motion compensation unit 404 determines the prediction information for the video decoding block by analyzing the motion vector and other associated syntax elements, and uses the prediction information to generate the predictive block of the video decoding block being decoded. A decoded video block is formed by summing the residual block from the inverse transform and scaling unit 402 and the corresponding predictive block generated by the intra prediction unit 403 or the motion compensation unit 404. The decoded video signal passes through the filtering unit 405 in order to remove the block effect artifacts, which can improve the video quality. The decoded video block is then stored in the decoded picture buffer 406. The decoded picture buffer 406 stores reference pictures used for subsequent intra prediction or motion compensation, and is also configured for the output of the video signal, so that the restored original video signal is obtained.

The colour component prediction method in the embodiments of this disclosure is mainly applied to the intra prediction unit 303 section as shown in FIG. 3 and the intra prediction unit 403 section as shown in FIG. 4, and is specifically applied to a CCLM prediction section in intra prediction. That is, the colour component prediction method in the embodiments of this disclosure can be applied to not only a video coding system but also a video decoding system, and can even be applied to both the video coding system and the video decoding system. No specific limitation is made in the embodiments of this disclosure. When this method is applied to the intra prediction unit 303 section, the "coding block in the video picture" specifically refers to the current coding block in the intra prediction. When this method is applied to the intra prediction unit 403 section, the "coding block in the video picture" specifically refers to the current decoding block in the intra prediction.

Figure 5:
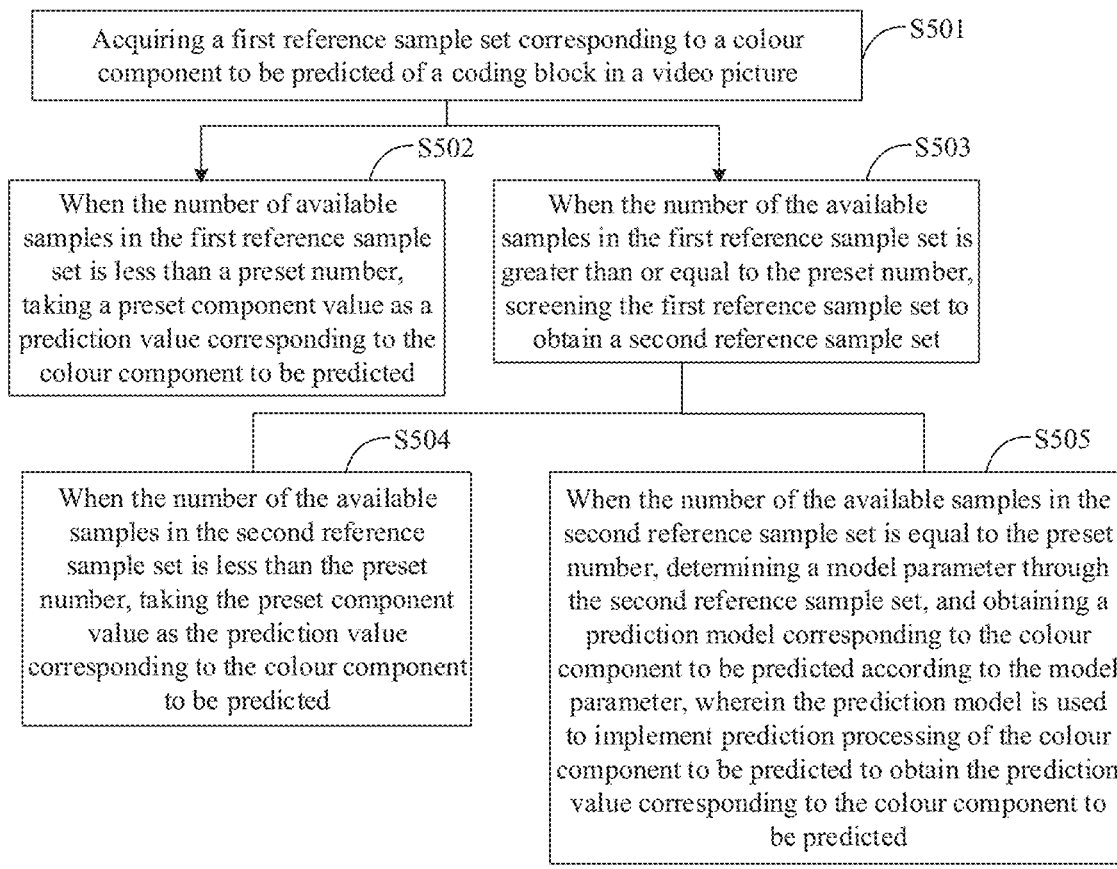
FIG. 5 is a schematic flowchart of a method for a colour component prediction according to an embodiment of this disclosure.

Based on the application scenario example in FIG. 3 or FIG. 4, referring to FIG. 5, FIG. 5 is a schematic flowchart of a method for a colour component prediction according to an embodiment of this disclosure. As shown in FIG. 5, the method may include the following operations.

At S501, a first reference sample set corresponding to a colour component to be predicted of a coding block in a video picture is acquired.

It is to be noted that the video picture can be partitioned into multiple coding blocks. Each coding block may include a first colour component, a second colour component, and a third colour component. The coding block in the embodiments of this disclosure is a current block to be coded in the video picture. When the first colour component needs to be predicted through a prediction model, the colour component to be predicted is the first colour component. When the second colour component needs to be predicted through the prediction model, the colour component to be predicted is the second colour component. When the third colour component needs to be predicted through the prediction model, the colour component to be predicted is the third colour component.

It is also to be noted that when the left neighbouring region, the bottom-left neighbouring region, the top neighbouring region, and the top-right neighbouring region are all available regions, for the INTRA_LT_CCLM mode, the first reference sample set includes neighbouring reference samples in the left neighbouring region and the top neighbouring region of the coding block, as shown in (a) of FIG. 2. For the INTRA_L_CCLM mode, the first reference sample set includes neighbouring reference samples in the left neighbouring region and the bottom-left neighbouring region of the coding block, as shown in (b) of FIG. 2. For the INTRA_T_CCLM mode, the first reference sample set includes neighbouring reference samples in the top neighbouring region and the top-right neighbouring region of the coding block, as shown in (c) of FIG. 2.

In some embodiments, optionally, for S501, acquiring the first reference sample set corresponding to the colour component to be predicted of the coding block in the video picture may include the following operations.

At S501a-1, reference samples neighboring at least one side of the coding block are obtained. The at least one side includes a left side of the coding block and/or a top side of the coding block.

At S501a-2, the first reference sample set corresponding to the colour component to be predicted is formed based on the reference samples.

It is to be noted that the at least one side of the coding block may include the left side of the coding block and the top side of the coding block. That is, the at least one side of the coding block may refer to the top side of the coding block or the left side of the coding block, and may even refer to the top side and the left side of the coding block. No specific limitation is made in the embodiments of this disclosure.

Thus, for the INTRA_LT_CCLM mode, when the left neighbouring region and the top neighbouring region are both available regions, the first reference sample set may consist of reference samples neighboring the left side of the coding block and reference samples neighboring the top side of the coding block. When the left neighbouring region is an available region while the top neighbouring region is an unavailable region, the first reference sample set may consist of the reference samples neighboring the left side of the coding block. When the left neighbouring region is an unavailable region while the top neighbouring region is an available region, the first reference sample set may consist of the reference samples neighboring the top side of the coding block.

In some embodiments, optionally, for S501, acquiring the first reference sample set corresponding to the colour component to be predicted of the coding block in the video picture may include the following operations.

At S501b-1, reference samples in a reference row or a reference column neighboring the coding block are acquired. The reference row includes a row neighboring the top side and a top-right side of the coding block, and the reference column includes a column neighboring the left side and a bottom-left side of the coding block.

At S501b-2, the first reference sample set corresponding to the colour component to be predicted is formed based on the reference samples.

It is to be noted that the reference row neighboring the coding block may consist of the row neighboring the top side and the top-right side of the coding block, and the reference column neighboring the coding block may consist of the column neighboring the left side and the bottom-left side of the coding block. The reference row or reference column neighboring the coding block may refer to the reference row neighboring the top side of the coding block or the reference column neighboring the left side of the coding block, and may even refer to the reference row or reference column neighboring other sides of the coding block. No specific limitation is made in the embodiments of this disclosure. For the case of description, in the embodiments of this disclosure, the reference row neighboring the coding block is described by taking the reference row neighboring the top side as an example, and the reference column neighboring the coding block is described by taking the reference column neighboring the left side as an example.

The reference samples in the reference row neighboring the coding block may include reference samples neighboring the top side and the top-right side (also referred to as neighbouring reference samples corresponding to the top side and the top-right side). The top side represents the top side of the coding block, and the top-right side represents that the top side of the coding block horizontally extends to the right by an side length the same as the height of the current coding block. The reference samples in the reference column neighboring the coding block may include reference samples neighboring the left side and the bottom-left side (also referred to as neighbouring reference samples corresponding to the left side and the bottom-left side). The left side represents the left side of the coding block, and the bottom-left side represents that the left side of the coding block vertically extends downward by an side length the same as the height of the current decoding block. However, no specific limitation is made in the embodiments of this disclosure.

Thus, for the INTRA_L_CCLM mode, when the left neighbouring region and the bottom-left neighbouring region are both available regions, the first reference sample set may consist of the reference samples in the reference column neighboring the coding block. For the INTRA_T_CCLM mode, when the top neighbouring region and the top-right neighbouring region are both available regions, the first reference sample set may consist of the reference samples in the reference row neighboring the coding block.

At S502, when the number of available samples in the first reference sample set is less than a preset number, a preset component value is taken as a prediction value corresponding to the colour component to be predicted.

It is to be noted that the number of the available samples can be determined based on the availableness of the neighbouring regions, and can also be determined based on the number of the available samples in the selection regions. For some special cases, such as an side case of the coding block, an unpredictable case, and a case where a coding sequence leads to an inability to obtain the neighbouring reference samples, and even for a case where the coding block is partitioned according to tiles and slices, the left neighbouring region, the bottom-left neighbouring region, the top neighbouring region, and the top-right neighbouring region are not all available regions, and there may be an unavailable region, resulting in that the number of the available samples in the selection regions may be less than the preset number, so that the number of the available samples in the first reference sample set is less than the preset number.

It is to be noted that the preset number is a preset judgment value of the number of the available samples, and is used to determine whether to execute model parameter derivation and an operation of constructing a prediction model for the colour component to be predicted. The preset number may be 4. No specific limitation is made in the embodiments of this disclosure. In this way, assuming that the preset number is 4, that is, when the number of the available samples in the first reference sample set is 0 or 2, the preset component value can be directly taken as the prediction value corresponding to the colour component to be predicted, so as to reduce the computational complexity.

In addition, the preset component value is used to represent a preset fixed value corresponding to the colour component to be predicted (may also be referred to as a default value). The preset component value is mainly related to the bit information of the current video picture. Therefore, in some embodiments, for S502, when the number of the available samples in the first reference sample set is less than the preset number, taking the preset component value as the prediction value corresponding to the colour component to be predicted may include the following operations.

At S502a, a preset component range corresponding to the colour component to be predicted is determined based on bit information of the video picture.

At S502b, an intermediate value of the preset component range is determined according to the preset component range, and the intermediate value is taken as the prediction value corresponding to the colour component to be predicted, herein the intermediate value is expressed as the preset component value.

It is to be noted that in the embodiments of this disclosure, the intermediate value of the preset component range corresponding to the colour component to be predicted may be taken as the preset component value, and then may be taken as the prediction value corresponding to the colour component to be predicted. Assuming that a bit depth of the colour component to be predicted is represented by BitDepthC, it can be derived that the calculation approach for the intermediate value of the colour component to be predicted is 1<<(BitDepthC−1). The calculation approach can be specifically set according to practical situations. No specific limitation is made in the embodiments of this disclosure.

Exemplarily, taking a chroma component as the colour component to be predicted for an example, assuming that the current video picture is an 8-bit video, the component range corresponding to the chroma component is 0-255, and in this case, the intermediate value is 128, and the preset component value may be 128, that is, the default value is 128. Assuming that the current video picture is a 10-bit video, the component range corresponding to the chroma component is 0-1023, and in this case, the intermediate value is 512, and the preset component value may be 512, that is, the default value is 512. In the embodiments of this disclosure, the bit information of the video picture being 10 bits is taken as an example, that is, the preset component value is 512.

Further, in some embodiments, for S502, after taking the preset component value as the prediction value corresponding to the colour component to be predicted, the method may further include the following operation.

At S502c, for each sample in the coding block, the preset component value is used to perform prediction value filling on the colour component to be predicted of each sample.

It is to be noted that for the case where the number of the available samples in the first reference sample set is less than the preset number, there is no need to add an additional processing module, the fixed default value is directly used to perform prediction value filling on the colour component to be predicted in the coding block.

Exemplarily, assuming that the preset component value is 512, and the colour component to be predicted is the chroma component, for a chroma prediction value corresponding to each sample in the coding block, 512 may be directly used to fill the chroma prediction value.

At S503, when the number of the available samples in the first reference sample set is greater than or equal to the preset number, the first reference sample set is screened to obtain a second reference sample set.

It is to be noted that in the first reference sample set, there may be some unimportant reference samples (for example, these reference samples have poor correlation) or some abnormal reference samples. In order to ensure the accuracy of the prediction model, these reference samples need to be eliminated, and thus the second reference sample set is obtained. The number of the available samples in the second reference sample set here is less than or equal to the preset number. For the number of the available samples included in the second reference sample set, in practical applications, the preset number is generally chosen to be 4. However, no specific limitation is made in the embodiments of this disclosure.

It is to be noted that when the number of the available samples in the first reference sample set is greater than or equal to the preset number, the first reference sample set may also be screened to obtain the second reference sample set. After the second reference sample set is obtained, it is still necessary to make a judgment according to the number of the available samples in the second reference sample set and the preset number. If the number of the available samples in the second reference sample set is less than the preset number, the preset component value may be taken as the prediction value corresponding to the colour component to be predicted. If the number of the available samples in the second reference sample set is equal to the preset number, the model parameters can be derived according to the second reference sample set.

Further, in some embodiments, for S503, screening the first reference sample set to obtain the second reference sample set may include the following operation.

Positions of samples to be selected are determined based on sample positions and/or colour component strengths corresponding to neighbouring reference samples in the first reference sample set; and available samples corresponding to the positions of the samples to be selected are chosen from the first reference sample set according to the determined positions of samples to be selected, and the chosen available samples are combined into the second reference sample set, where the number of the available samples in the second reference sample set is less than or equal to the preset number.

Specifically, the first reference sample set may be screened according to positions of reference samples to be selected, and may also be screened according to colour component strengths (such as a luma value and a chroma value), so that the chosen reference samples to be selected are combined into the second reference sample set. The following takes the positions of the reference samples to be selected as an example for description.

Assuming that the number of available sample samples in the top region and the top-right region neighboring the current coding block is numSampT, and the number of available sample samples in the left region and the bottom-left region neighboring the current coding block is numSampL, the screening process is as follows (availT indicates the availability of a top neighbouring row of the current coding block, availL indicates the availability of a left neighbouring column of the current coding block, nTbW indicates the width of the current coding block, and nTbH indicates the height of the current coding block):

If the intra prediction mode of the current
block is the INTRA_LT_CCLM
mode,
    numSampT=availT?nTbW:0
    numSampL=availL?nTbH:0
  otherwise,
    numSampT=(availT&&predModeIntra==INTRA_T_CCLM)?(nTbW+Min(numTopRight, nTbH)):0
    numSampL=(availL&&predModeIntra==INTRA_L_CCLM)?(nTbH+Min(numLeftBelow, nTbW)):0

Here, numTopRight represents the number of available samples in a top-right nTbW range, and numLeftBelow represents the number of available samples in a bottom-left nTbH range. The number of samples screened on each side is represented by cntN, the position of a start point is represented by startPosN, the selected point interval is represented by pickStepN, and the position of the sample to be selected is represented by pickPosN[pos]. The derivation process is as follows:

variable numIs4N indicates whether to screen samples on only one side:
numIs4N=((availT&&availL&&predModeIntra=INTRA_LT_CCLM)?0:1)
variable startPosN indicates the position of the start point:
startPosN=numSampN>>(2+numIs4N)
variable pickStepN indicates the selected point interval:
pickStepN=Max(1, numSampN>>(1+numIs4N))

Here, N is replaced by T and L separately, which may respectively indicate that the samples are screened on the top and on the left, that is, side N here represents side T or side L. If the availability availN of the side N is TRUE and the selected intra mode predModeIntra is the INTRA_LT_CCLM mode or an INTRA_N_CCLM mode, the number cntN of the samples screened on the side N and the positions pickPosN[pos] of samples to be selected are shown as follows (it is to be noted that the total number of the samples to be screened is cntT+cntL):

cntN=Min(numSampN, (1+numIs4N)<<1)
pickPosN[pos]=(startPosN+pos*pickStepN), with pos=0...cntN−1
  Otherwise, cntN is set to 0, that is, the number of the samples to be screened is
0.

Assuming that the prediction sample of the current coding block is predSamples[x][y] with x=0 . . . nTbW−1, y=0 . . . nTbH−1, the derivation thereof is as follows:

if both numSampL and numSampT are unavailable, the both are set to the default value, as shown below:
  predSamples[x][y]=1<<(BitDepthc−1),
  otherwise,
  at a first step, a luma reconstruction sample pY[x][y] with x=0...nTbW*2−1, y=0...nTbH*2−1 of a collocated luma block is acquired.
  At a second step, an neighbouring luma reconstruction sample pY[x][y] is acquired.
  At a third step, a downsampling luma reconstruction sample pDsY[x][y] with x=0...nTbW−1, y=0...nTbH−1 is acquired.
  At a fourth step, when numSampL is greater than 0, the chroma value pSelC[idx] of a point selected on the left is set to p[−1][pickPosL[idx]] with idx=0...cntL−1, and a downsampling reconstructed luma value pSelDsY[idx] with idx=0...cntL−1 of the point selected on the left is acquired.
  At a fifth step, when numSampT is greater than 0, the chroma value pSelC[idx] of a point selected on the top is set to p[pickPosT[idx−cntL]][−1] with idx=cntL...cntL+cntT−1, and a downsampling reconstructed luma value pSelDsY[idx] with idx=0...cntL+cntT−1 of the point selected on the top is acquired.
  At a sixth step, when cntT+cntL is not equal to 0, the variables minY, maxY, and minC and maxC are derived as follows:
    when cntT+cntL is equal to 2, pSelComp[3] is set to pSelComp[0], pSelComp[2] is set to pSelComp[1], pSelComp[0] is set to pSelComp[1], and pSelComp[1] is set to pSelComp[3]. Here, Comp is replaced by DsY and C separately to represent the reconstructed luma and reconstructed chroma of the selected neighbouring sample.

The arrays minGrpIdx and maxGrpIdx are derived as follows:

$$minGrpIdx[0] = 0$$
$$minGrpIdx[1] = 2$$
$$maxGrpIdx[0] = 1$$
$$maxGrpIdx[1] = 3$$

When pSelDsY[minGrpIdx[0]] is greater than pSelDsY[minGrpIdx[1]], minGrpIdx[0] and minGrpIdx[1] are exchanged, $$(minGrpIdx[0], minGrpIdx[1]) = Swap(minGrpIdx[0], minGrpIdx[1])$$

when pSelDsY[maxGrpIdx[0]] is greater than pSelDsY[maxGrpIdx[1]], maxGrpIdx[0] and maxGrpIdx[1] are exchanged, $$(maxGrpIdx[0], maxGrpIdx[1]) = Swap(maxGrpIdx[0], maxGrpIdx[1])$$

when pSelDsY[minGrpIdx[0]] is greater than pSelDsY[maxGrpIdx[1]], the arrays minGrpIdx and maxGrpIdx are exchanged, $$(minGrpIdx, maxGrpIdx) = Swap(minGrpIdx, maxGrpIdx)$$

when pSelDsY[minGrpIdx[1]] is greater than pSelDsY[maxGrpIdx[0]], minGrpIdx[1] and maxGrpIdx[0] are exchanged:

$$(minGrpIdx[0], maxGrpIdx[0]) = Swap(minGrpIdx[1], maxGrpIdx[0])$$

The variables max Y, maxC, minY, and minC are calculated as follows (which represent an average value of the two groups, respectively):

$$maxY = (pSelDsY[maxGrpIdx[0]] + pSelDsY[maxGrpIdx[1]] + 1) >> 1$$
$$maxC = (pSelC[maxGrpIdx[0]] + pSelC[maxGrpIdx[1]] + 1) >> 1$$
$$minY = (pSelDsY[minGrpIdx[0]] + pSelDsY[minGrpIdx[1]] + 1) >> 1$$
$$minC = (pSelC[minGrpIdx[0]] + pSelC[minGrpIdx[1]] + 1) >> 1$$

At a seventh step, the derivation process of the linear model parameters a, b, and k is as follows (here, a is a slope (the ratio of the difference in chroma to the difference in luma), b is an intercept, and k is the shift of a, and a is stored as an integer):

when numSampL is equal to 0, and numSampT is equal to 0,
k=0
a=0
b=1<<(BitDepth$_c$−1)

otherwise,
diff=maxY−minY
If diff is not equal to 0,
diffC=maxC−minC
x=Floor(Log2(diff))
normDiff=((diff<<4)>>x) & 15
x+=(normDiff!=0)?1:0
y=Floor(Log2(Abs(diffC)))+1
a=(diffC*(divSigTable[normDiff]|8)+2$^{y-1}$)>>y
k=((3+x−y) < 1)?1:3+x−y
a=((3+x−y) < 1) ? Sign(a)*15:a
b=minC−((a*minY)>>k)
where divSigTable[ ] is divSigTable[ ]={0,7,6,5,5,4,4,3,3,2,2,1,1,1,1,0}
otherwise (when diff is equal to 0),
k=0
a=0
b=minC At an eighth step, the chroma prediction sample predSamples[x][y] with x=0 . . . nTbW−1, y=0 . . . nTbH−1 is obtained according to the following calculation (where Clip1C limits the prediction value to 0-1023):

$$predSamples[x][y] = Clip1C(((pDsY[x][y]*a) >> k) + b)$$

Figure 6A:
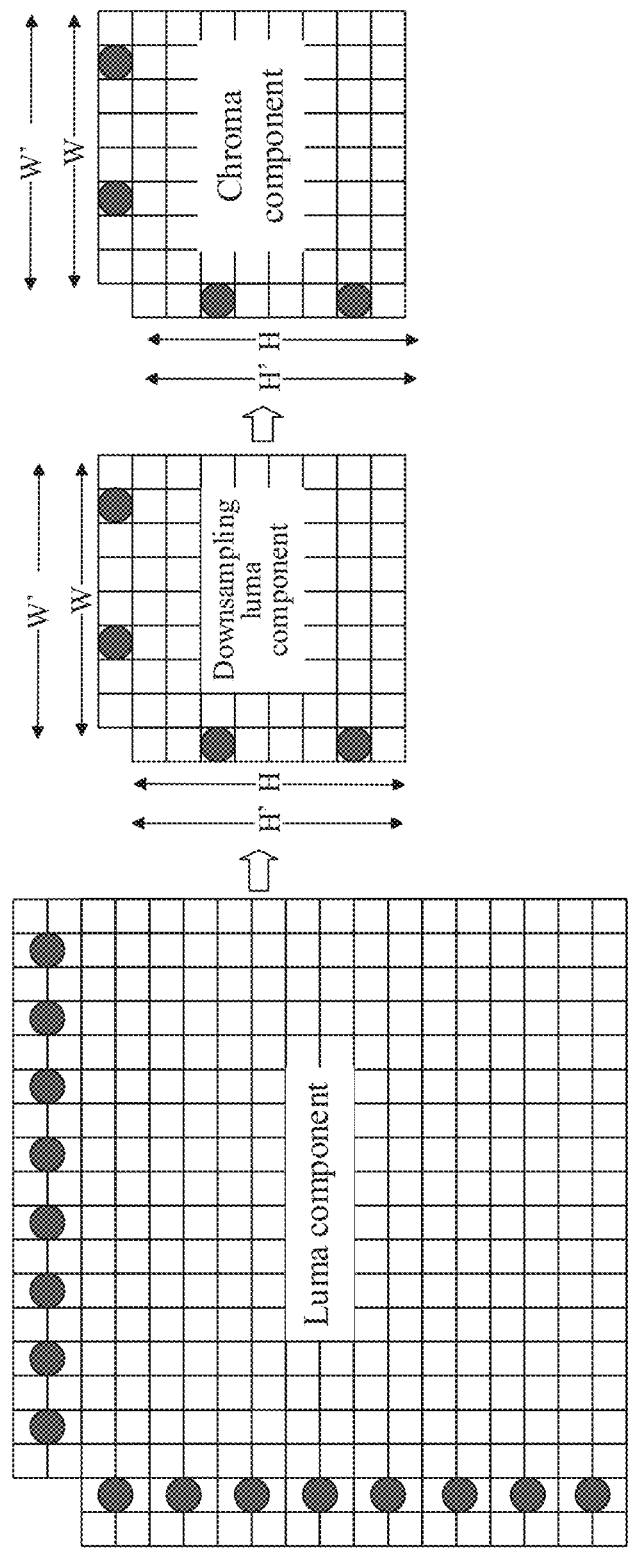
FIG. 6A is a schematic structural diagram of neighbouring reference sample selection in an INTRA_LT_CCLM mode according to an embodiment of this disclosure.

For example, screening four neighbouring reference picture samples is taken as an example for description. It is assumed that the positions of the reference samples in the top selection region W' are S[0, −1] . . . , S[W'−1, −1] and the positions of the reference samples in the left selection region H' are S[−1, 0], . . . , S−1, H'−1| In this way, the screening approach for selecting at most four neighbouring reference samples is as follows:

For the INTRA_LT_CCLM mode, when both the top neighbouring region and the left neighbouring region are available, two neighbouring reference samples to be selected can be chosen in the top selection region W', and the corresponding positions thereof are S[W'/4, −1] and S[3W'/4, −1], respectively. Two neighbouring reference samples to be selected can be chosen in the left selection region H', and the corresponding positions thereof are S[−1, H'/4] and S[−1,3H'/4] respectively. The four neighbouring reference samples to be selected are combined into the second reference sample set, as shown in FIG. 6A. In FIG. 6A, both the left neighbouring region and the top neighbouring region of the coding block are available. Moreover, in order to maintain the luma component and the chroma component to have the same resolution, it is also necessary to down-sample the luma component, so that the downsampling luma component has the same resolution as the chroma component.

Figure 6B:
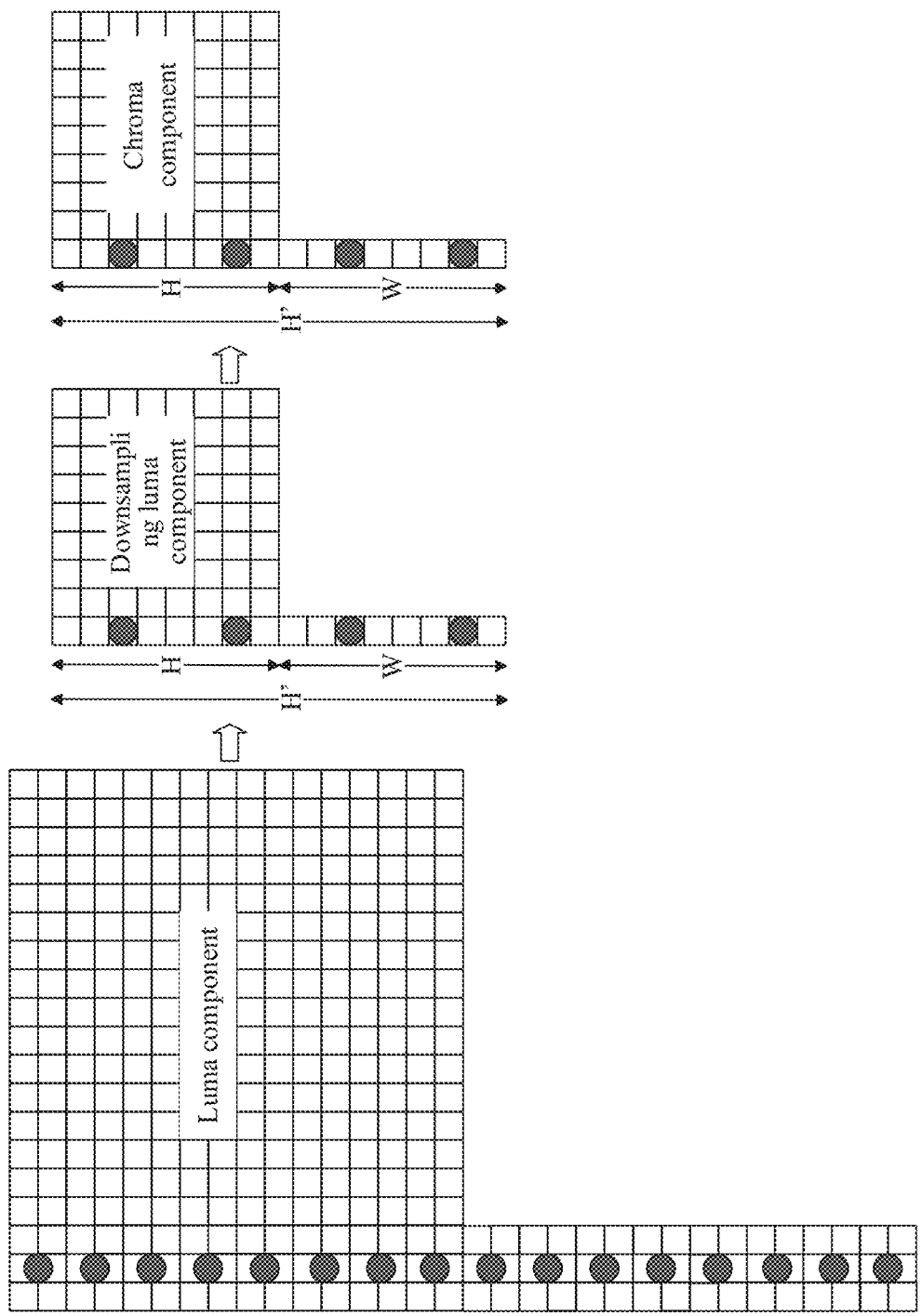
FIG. 6B is a schematic structural diagram of neighbouring reference sample selection in an INTRA_L_CCLM mode according to an embodiment of this disclosure.

For the INTRA_L_CCLM mode, when only the left neighbouring region and the bottom-left neighbouring region are available, four neighbouring reference samples to be selected can be chosen in the left selection region H', and the corresponding positions thereof are S[−1, H'/8], S[−1, 3H/8], S[−1,5H/8], and S[−1,7H/8] respectively. The four neighbouring reference samples to be selected are combined into the second reference sample set, as shown in FIG. 6B. In FIG. 6B, both the left neighbouring region and the bottom-left neighbouring region of the coding block are available. Moreover, in order to maintain the luma component and the chroma component to have the same resolution, it is still necessary to down-sample the luma component, so that the downsampling luma component has the same resolution as the chroma component.

Figure 6C:
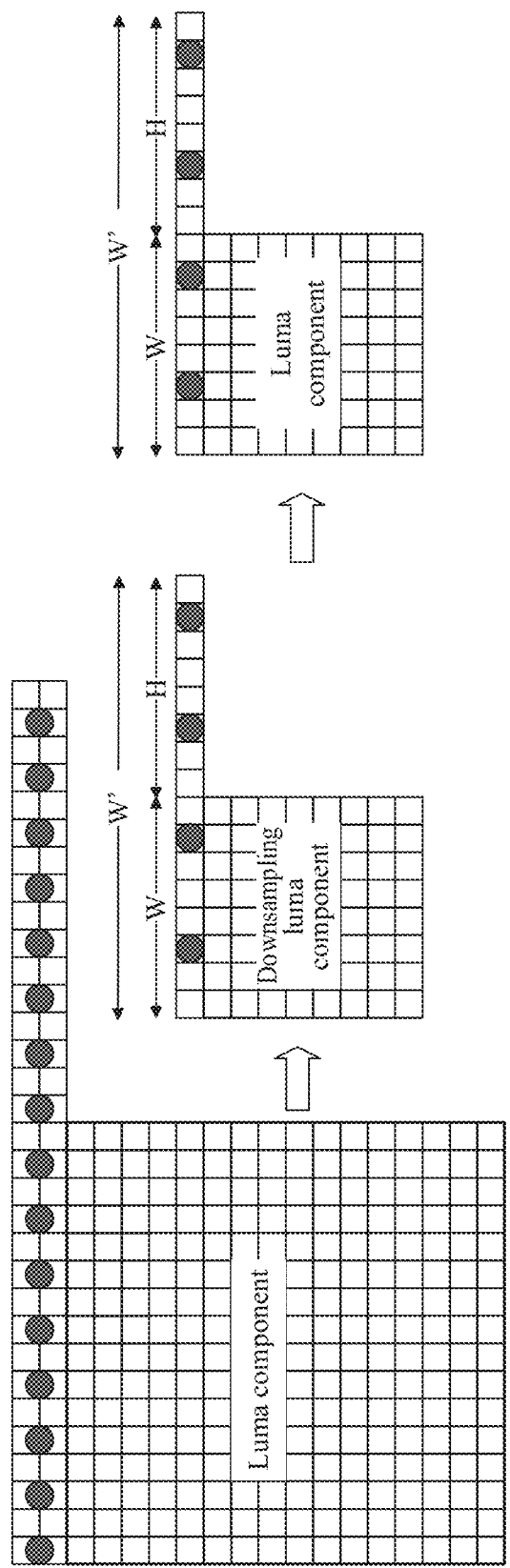
FIG. 6C is a schematic structural diagram of neighbouring reference sample selection in an INTRA_T_CCLM mode according to an embodiment of this disclosure.

For the INTRA_T_CCLM mode, when only the top neighbouring region and the top-right neighbouring region are available, four neighbouring reference samples to be selected can be chosen in the top selection region W', and the corresponding positions thereof are S[W'/8, −1], S[3 W'/8, −1] [5 W'/8, −1], and S[7 W'/8, −1] respectively. The four neighbouring reference samples to be selected are combined into the second reference sample set, as shown in FIG. 6C. In FIG. 6C, both the top neighbouring region and the top-right neighbouring region of the coding block are available. Moreover, in order to maintain the luma component and the chroma component to have the same resolution, it is still necessary to down-sample the luma component, so that the downsampling luma component has the same resolution as the chroma component.

In this way, for the case where the number of the available samples in the first reference sample set is greater than or equal to the preset number, by screening the first reference sample set, the second reference sample set can be obtained, and the second reference sample set includes four available samples.

At S504, when the number of the available samples in the second reference sample set is less than the preset number, the preset component value is taken as the prediction value corresponding to the colour component to be predicted.

At S505, when the number of the available samples in the second reference sample set is equal to the preset number, a model parameter is determined through the second reference sample set, and a prediction model corresponding to the colour component to be predicted is obtained according to the model parameter.

It is to be noted that the second reference sample set is obtained after screening the first reference sample set. The number of the available samples in the second reference sample set may be less than the preset number, and may also be greater than or equal to the preset number. If the number of the available samples in the second reference sample set is less than the preset number, the preset component value is directly taken as the prediction value corresponding to the colour component to be predicted. If the number of the available samples in the second reference sample set is greater than or equal to the preset number, the model parameter is determined through the second reference sample set, and the prediction model corresponding to the colour component to be predicted is obtained according to the model parameter. It is to be noted that, since the reference samples used in model parameter derivation are generally 4, the number of the available samples of the second reference sample set obtained after the screening is either less than the preset number (the second reference sample set includes less than four available samples) or equal to the preset number (the second reference sample set includes four available samples).

It is to be noted that the prediction model may be a linear model or a nonlinear model. The nonlinear model may be a non-linear form such as a quadratic curve; or a non-linear form consisting of multiple linear models, such as a Multiple Model CCLM (MMLM) cross-component prediction technology, which is the nonlinear form consisting of multiple linear models. No specific limitation is made in the embodiments of this disclosure. The prediction model can be used to implement the prediction processing of the colour component to be predicted to obtain the prediction value corresponding to the colour component to be predicted.

After the second reference sample set is obtained, if the number of the available samples in the second reference sample set is equal to the preset number, the model parameter can be determined according to the second reference sample set. After the model parameter is derived, the prediction model corresponding to the chroma component can also be obtained according to the model parameter, as shown in formula (1). Then, the prediction model is used to perform prediction processing on the chroma component so as to obtain the prediction value corresponding to the chroma component.

Further, in some embodiments, for S505, after obtaining the prediction model corresponding to the colour component to be predicted according to the model parameter, the method may further include the following operations.

Prediction processing is performed on the colour component to be predicted of each sample in the coding block based on the prediction model, to obtain the prediction value corresponding to the colour component to be predicted of each sample.

It is to be noted that for the case where the number of the available samples in the first reference sample set is greater than or equal to the preset number, it is necessary to determine model parameters (such as α and β) through the first reference sample set, and then obtain the prediction model corresponding to the colour component to be predicted according to the model parameters, so as to obtain the prediction value corresponding to the colour component to be predicted of each sample in the coding block. For example, assuming that the colour component to be predicted is the chroma component, the prediction model corresponding to the chroma component as represented by formula (1) can be obtained according to the model parameters α and β. Then, prediction processing is performed on the chroma component of each sample in the coding block by using the prediction model represented by formula (1), so that the prediction value corresponding to the chroma component of each sample can be obtained.

Figure 7:
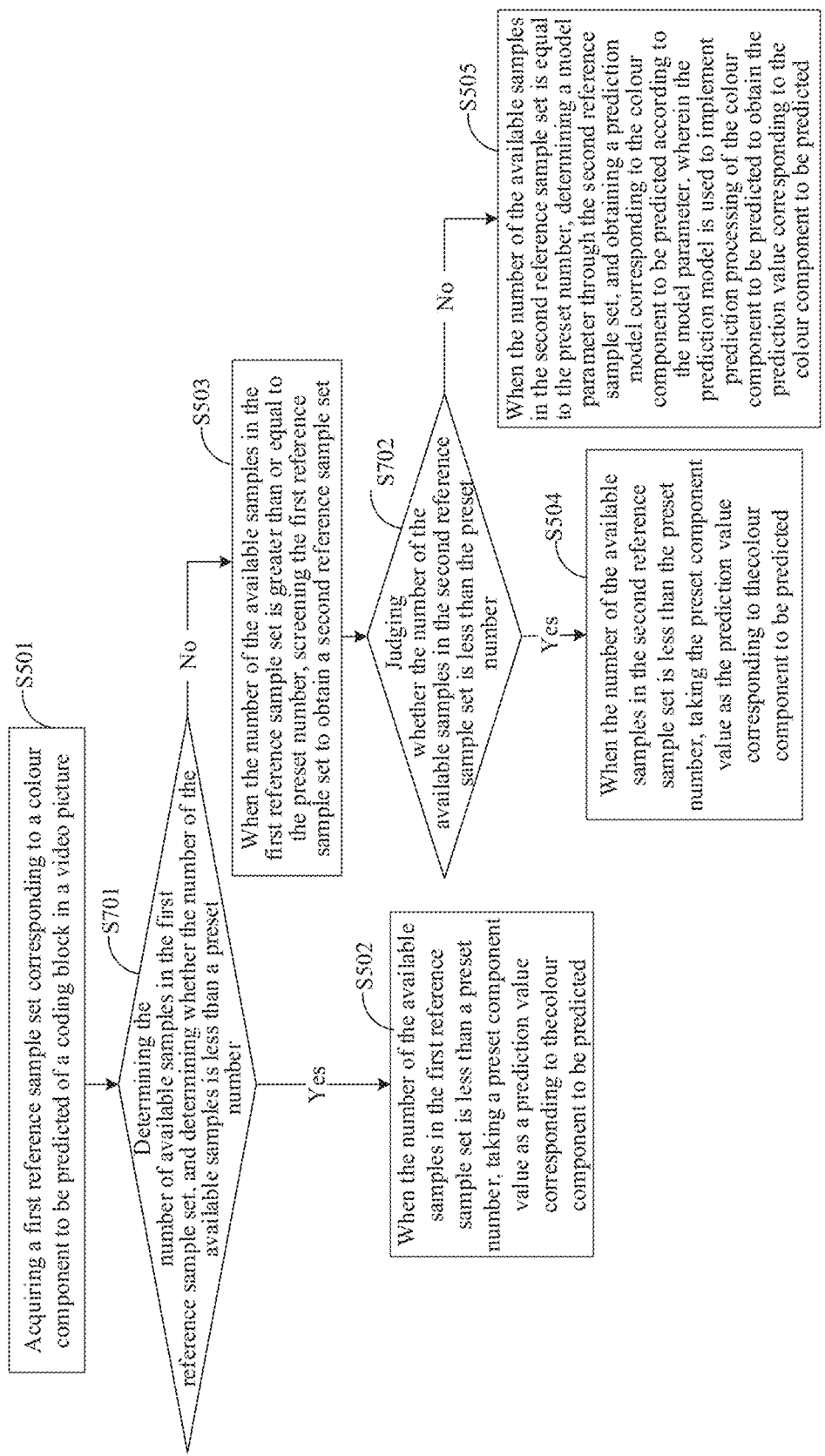
FIG. 7 is a schematic flowchart of another method for colour component prediction according to an embodiment of this disclosure.

In the embodiments of this disclosure, for the left neighbouring region, the bottom-left neighbouring region, the top neighbouring region, and the top-right neighbouring region, there may be available regions, and may also be unavailable regions, resulting in that the number of the available samples selected from the neighbouring regions may be less than the preset number. Therefore, in some embodiments, referring to FIG. 7, FIG. 7 is a schematic flowchart of another method for a colour component prediction according to an embodiment of this disclosure. As shown in FIG. 7, after S501, the method may further include the following operation.

At S701, the number of the available samples in the first reference sample set is determined, and whether the number of the available samples is less than the preset number is judged.

Further, after S503, the method may further include the following operation.

At S702, whether the number of the available samples in the second reference sample set is less than the preset number is judged.

It is to be noted that the number of the available samples can be determined based on a judgement of the availableness of the neighbouring regions. In this way, after the number of the available samples is determined, by comparing the number of the available samples with the preset number, when the number of the available samples in the first reference sample set is less than the preset number, operation S502 is executed. When the number of the available samples in the second reference sample set is less than the preset number, operation S504 is executed. When the number of the available samples in the second reference sample set is greater than or equal to the preset number, operation S505 is executed.

It is also to be noted that the preset number may be 4. The following describes in detail an example in which the preset number is equal to 4.

In a possible implementation, when the number of the available samples in the first reference sample set is greater than or equal to the preset number, because the reference samples used in the model parameter derivation is generally 4, the first reference sample set can also be screened first, so that the number of the available samples in the first reference sample set is 4. Then, the model parameters are derived according to the four available samples, and the prediction model corresponding to the colour component to be predicted is obtained according to the model parameters, so as to obtain the prediction value corresponding to the colour component to be predicted.

Specifically, it is assumed that the colour component to be predicted is a chroma component, and the chroma component is predicted through a luma component. It is assumed that the four available samples chosen by screening are numbered 0, 1, 2, and 3, respectively. By comparing the four chosen available samples, based on four comparisons, two samples having larger luma values (which may include a sample having the largest luma value and a sample having the second largest luma value) and two samples having smaller luma values (which may include a sample having the smallest luma value and a sample having the second smallest luma value) can further be selected. Furthermore, two arrays minIdx[2] and maxIdx[2] can be set to store the two groups of samples respectively. Initially, the available samples numbered 0 and 2 are first put into minIdx [2], and the available samples numbered 1 and 3 are put into maxIdx[2], as shown below:

$$Init: minIdx[2] = \{0, 2\}, maxIdx[2] = \{1, 3\}$$

After this, through four comparisons, the two samples having smaller luma values can be stored in minIdx[2], and the two samples having larger luma values can be stored in maxIdx[2]. The details are shown as follows:

Step1: if(L[minIdx[0]]>L[minIdx[1]], swap(minIdx[0], minIdx[1])

Step2: if(L[maxIdx[0]]>L[maxIdx[1]], swap(maxIdx[0], maxIdx[1])

Step3: if(L[minIdx[0]]>L[maxIdx[1]], swap(minIdx, maxIdx)

Step4: if(L[minIdx[1]]>L[maxIdx[0]], swap(minIdx[1], maxIdx[0])

In this way, two samples having smaller luma values can be obtained, the corresponding luma values thereof are respectively represented by $luma^0_{min}$ and $luma^1_{min}$, and the corresponding chroma values are respectively represented by $chroma^0_{min}$ and $chroma^1_{min}$. In addition, two samples having larger luma values can also be obtained, the corresponding luma values thereof are respectively represented by $luma^0_{max}$ and $luma^1_{max}$, and the corresponding chroma values are respectively represented by $chroma^0_{max}$ and $chroma^1_{max}$. Further, by calculating an average value of the luma values corresponding to the two samples having smaller values, a luma value corresponding to a first average point can be obtained and represented by $luma_{min}$. By calculating an average value of the luma values corresponding to the two samples having larger values, a luma value corresponding to a second average point can be obtained and represented by $luma_{max}$. Similarly, chroma values corresponding to the two average points can also be obtained and respectively represented by $chroma_{min}$ and $chroma_{max}$. The details are shown as follows:

$$luma_{min} = (luma^0_{min} + luma^1_{min} + 1) >> 1$$
$$luma_{max} = (luma^0_{max} + luma^1_{max} + 1) >> 1$$
$$chroma_{min} = (chroma^0_{min} + chroma^1_{min} + 1) >> 1$$
$$chroma_{max} = (chroma^0_{max} + chroma^1_{max} + 1) >> 1$$

That is, after the two average points ($luma_{min}$, $chroma_{min}$) and ($luma_{max}$, $chroma_{max}$) are obtained, the model parameters can be obtained from the two points through a calculation approach of "two points determine a straight line". Specially, the model parameters $\alpha$ and $\beta$ can be calculated according to formula (2), $$\begin{cases} \alpha = \dfrac{chroma_{max} - chroma_{min}}{luma_{max} - luma_{min}} \\ \beta = chroma_{min} - \alpha \times luma_{min} \end{cases} \quad (2)$$

The model parameter $\alpha$ is a slope in the prediction model, and the model parameter $\beta$ is an intercept in the prediction model. In this way, after the model parameters are derived, the prediction model corresponding to the chroma component can be obtained according to the model parameters, as shown in formula (1). Then, the prediction model is used to perform prediction processing on the chroma component so as to obtain the prediction value corresponding to the chroma component.

In another possible implementation, for some special cases, such as an side case of the coding block, an unpredictable case, and a case where a coding sequence leads to an inability to obtain the neighbouring reference samples, and even for a case where the coding block is partitioned according to tiles and slices, the left neighbouring region, the bottom-left neighbouring region, the top neighbouring region, and the top-right neighbouring region are not all available regions, and there may be an unavailable region, resulting in that the number of the available samples in the first reference sample set is less than the preset number.

Thus, since the preset number is 4, in some embodiments, for S502, when the number of the available samples in the first reference sample set is less than the preset number, taking the preset component value as the prediction value corresponding to the colour component to be predicted may include the following operation.

When the number of the available samples in the first reference sample set is 0 or 2, the preset component value is taken as the prediction value corresponding to the colour component to be predicted.

In some embodiments, for S504, when the number of the available samples in the second reference sample set is less than the preset number, taking the preset component value as the prediction value corresponding to the colour component to be predicted may include following operation.

When the number of the available samples in the second reference sample set is 0 or 2, the preset component value is taken as the prediction value corresponding to the colour component to be predicted.

That is, when the preset number is 4, regardless of the case where the number of the available samples in the first reference sample set is less than the preset number, or the case where the number of the available samples in the second reference sample set is less than the preset number, the number of the available samples is 0 or 2.

Specifically, when the total number of the neighbouring reference samples in the selection region used by the coding block is 0, zero available sample is selected at this time. In the following three special cases, zero available sample is obtained.

Figure 8A:
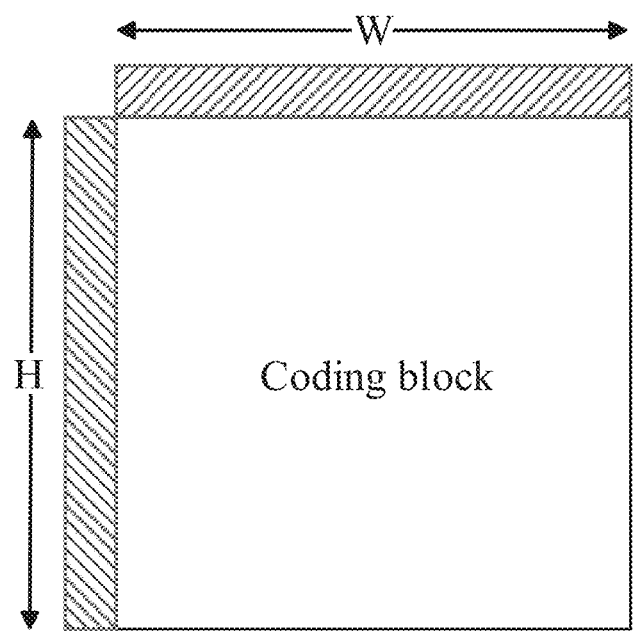
FIG. 8A is a schematic structural diagram of generation of zero available sample in an INTRA_LT_CCLM mode according to an embodiment of this disclosure.

In the first case, for the INTRA_LT_CCLM mode, when both the top neighbouring region and the left neighbouring region are unavailable, the selection regions meet W'=H'=0, as shown in FIG. 8A. In FIG. 8A, the region filled with gray slashes indicates the unavailable region.

Figure 8B:
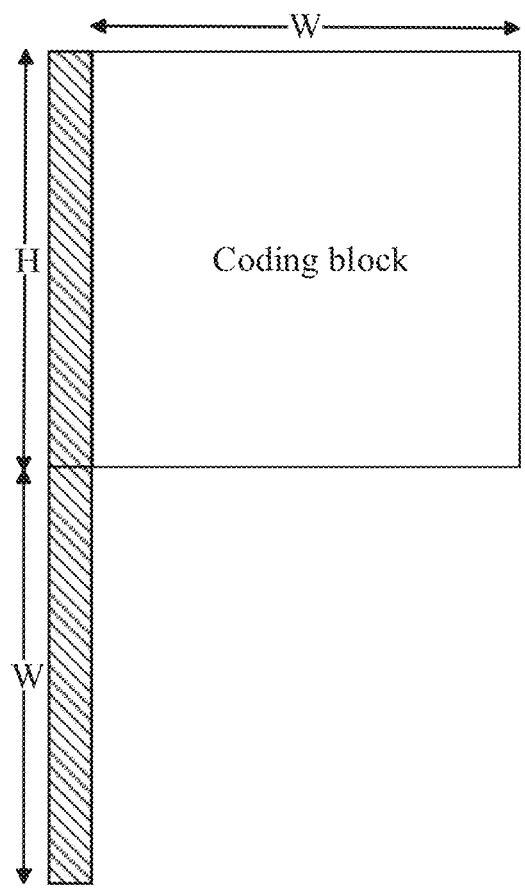
FIG. 8B is a schematic structural diagram of generation of zero available sample in an INTRA_L_CCLM mode according to an embodiment of this disclosure.

In the second case, for the INTRA_L_CCLM mode, when both the left neighbouring region and the bottom-left neighbouring region are unavailable, the selection regions meet H'=0, as shown in FIG. 8B. In FIG. 8B, the region filled with gray slashes indicates the unavailable region.

Figure 8C:
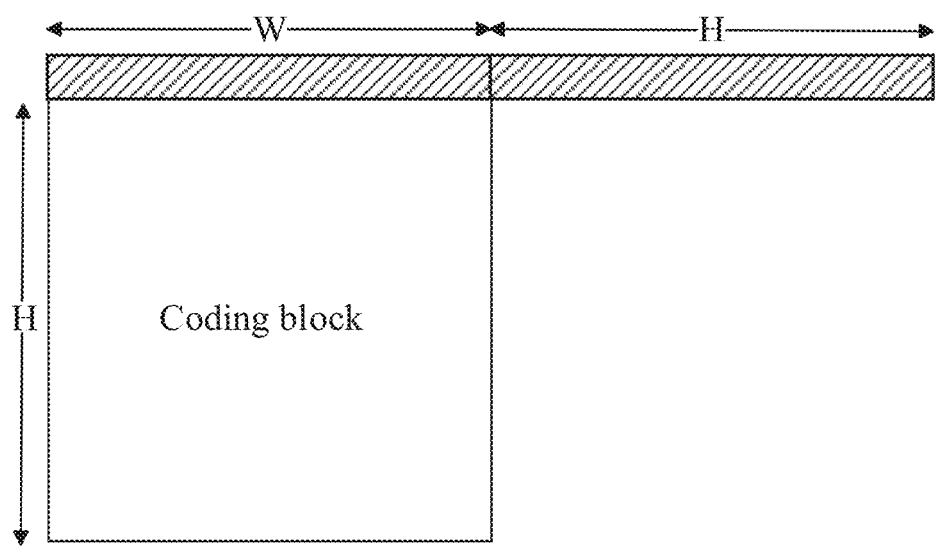
FIG. 8C is a schematic structural diagram of generation of zero available sample in an INTRA_T_CCLM mode according to an embodiment of this disclosure.

In the third case, for the INTRA_T_CCLM mode, when both the top neighbouring region and the top-right neighbouring region are unavailable, the selection regions meet W'=0, as shown in FIG. 8C. In FIG. 8C, the region filled with gray slashes indicates the unavailable region.

It is to be noted that the number of the available samples which is 0 is judged according to the availableness of the neighbouring regions. That is, the number of the available samples in the first reference sample set can be determined according to the availableness of the neighbouring regions. When the number of the available samples is 0, the model parameter $\alpha$ may be set to 0, and the model parameter $\beta$ may be set to the preset component value corresponding to the colour component to be predicted.

Assuming that the colour component to be predicted is a chroma component, the prediction values $Pred_C[i, j]$ corresponding to the chroma components of all samples in the current coding block can be filled with the preset component value, i.e., the default value of the chroma components. In the embodiments of this disclosure, the default value is an intermediate value of the chroma components. Exemplarily, assuming that the current video picture is an 8-bit video, the component range corresponding to the chroma component is 0-255, and in this case, the intermediate value is 128, and the preset component value may be 128. Assuming that the current video picture is a 10-bit video, the component range corresponding to the chroma component is 0-1023, and in this case, the intermediate value is 512, and the preset component value may be 512.

Specifically, when the total number of the neighbouring reference samples in the selection regions used by the coding block is 2, two available samples are selected at this time. Still assuming that the size of the coding block is W×H, this case can only occur for a 2×N or N×2 coding block. The latest VVC reference software VTM5.0 limits the division of 2×2, 2×4 and 4×2 coding blocks, that is, in the coding block division of a video picture, there are no coding blocks of the three sizes. Therefore, the value of N generally meets N≥8. Two available samples are obtained in the following three special cases.

Figure 9A:
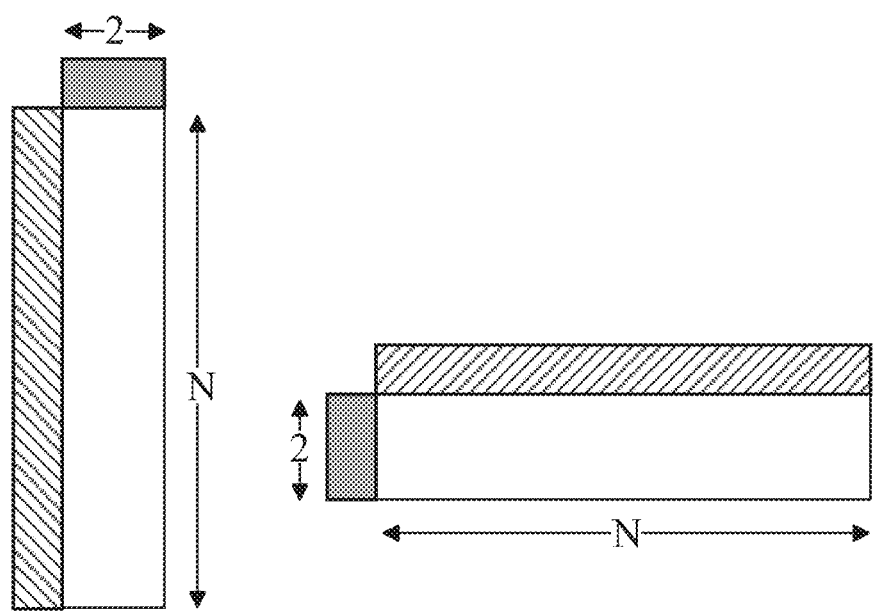
FIG. 9A is a schematic structural diagram of generation of two available samples in an INTRA_LT_CCLM mode according to an embodiment of this disclosure.

In the first case, for the INTRA_LT_CCLM mode, and for the 2×N or N×2 coding block (N≥8), when the neighbouring region on the side having an side length of 2 is available while the neighbouring region on the side having an side length of N is unavailable, the selection regions meet W'=2 and H'=0, or W'=0 and H'=2, as shown in FIG. 9A. In FIG. 9A, the region filled with gray slashes indicates the unavailable region, and the region filled with solid gray color indicates the available region.

Figure 9B:
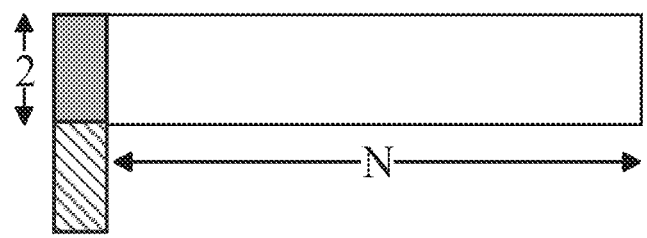
FIG. 9B is a schematic structural diagram of generation of two available samples in an INTRA_L_CCLM mode according to an embodiment of this disclosure.

In the second case, for the INTRA_L_CCLM mode, and for the N×2 coding block (N≥8), when the left neighbouring region having an side length of 2 is available and the bottom-left neighbouring region is unavailable, the selection regions meet H'=2, as shown in FIG. 9B. In FIG. 9B, the region filled with gray slashes indicates the unavailable region, and the region filled with solid gray color indicates the available region.

Figure 9C:
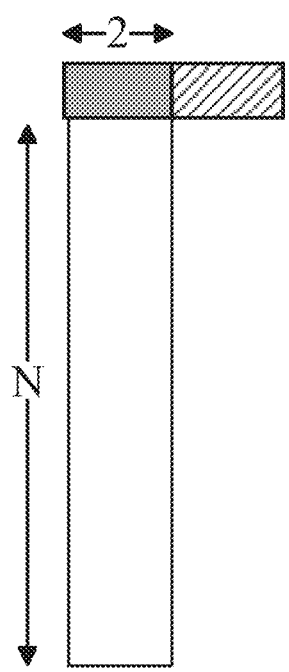
FIG. 9C is a schematic structural diagram of generation of two available samples in an INTRA_T_CCLM mode according to an embodiment of this disclosure.

In the third case, for the INTRA_T_CCLM mode, and for the 2×N coding block (N≥8), when the top neighbouring region having an side length of 2 is available and the top-right neighbouring region is unavailable, the selection regions meet W'=2, as shown in FIG. 9C. In FIG. 9C, the region filled with gray slashes indicates the unavailable region, and the region filled with solid gray color indicates the available region.

It is also to be noted that the number of the available samples which is 2 can be determined based on the judgement of the availableness of the neighbouring regions, can also be determined based on the number of the available samples in the selection regions, and can also be determined according to other judgment conditions. No specific limitation is made in the embodiments of this disclosure. In this way, the number of the available samples in the first reference sample set can be determined according to the availableness of the neighbouring regions.

In the solutions of the prior art, for the case where there are two available samples, it is necessary to copy the two available samples to obtain 4 samples. Exemplarily, assuming that the four samples are numbered 0, 1, 2, and 3, number 0 represents the second available sample chosen, number 1 represents the first available sample chosen, number 2 represents the second available sample chosen, and number 3 represents the first available sample chosen. Then, the model parameters $\alpha$ and $\beta$ can be determined according to the four samples numbered 0, 1, 2, and 3, thereby establishing the prediction model as represented by formula (1). The prediction value corresponding to the colour component to be predicted can be obtained through the prediction model.

In the embodiments of this disclosure, for the case where there are two available samples, no additional "copy" operation is required, and the fixed default value is directly used to fill the prediction value corresponding to the colour component to be predicted. That is, when the number of the available samples is 2, the model parameter $\alpha$ may be set to 0, and the model parameter $\beta$ may also be set to the preset component value corresponding to the colour component to be predicted. Assuming that the colour component to be predicted is a chroma component, the prediction values $Pred_C[i, j]$ corresponding to the chroma components of all the samples in the current coding block can be filled with the preset component value, i.e., the default value of the chroma components.

In this way, in the solutions of the prior art, when the number of the available samples is 2, in order to use the same processing module, an additional "copy" operation is required to obtain four samples. Thus, the model parameters can be derived according to the same operation process as when the number of the available samples is 4, and an additional "copy" operation is added. Moreover, the four samples obtained still need four comparisons and four averaging calculations, which results in higher computational complexity. However, in the embodiments of this disclosure, the processing when the number of the available samples is 2 is aligned with the processing when the number of the available samples is 0. In this case, the same processing module can be used without adding an additional operation, thereby reducing the computational complexity.

Figure 10:
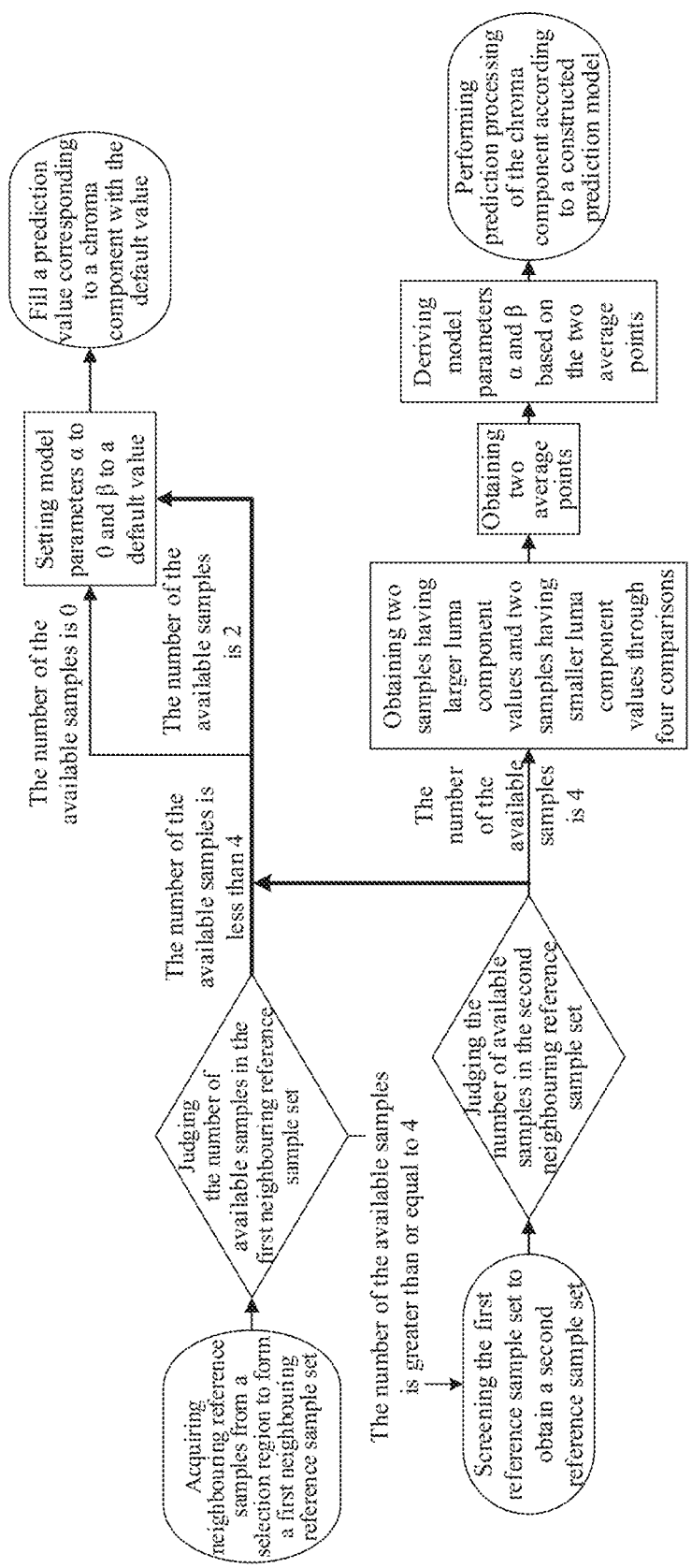
FIG. 10 is a schematic flowchart of model parameter derivation according to an embodiment of this disclosure.

Referring to FIG. 10, FIG. 10 is a schematic flowchart of model parameter derivation according to an embodiment of this disclosure. In FIG. 10, assuming that the colour component to be predicted is a chroma component. Firstly, neighbouring reference samples are obtained from a selection region to form a first neighbouring reference sample set. Then, the number of available samples in the first neighbouring reference sample set is judged. When the number of the available samples is greater than or equal to 4, the first reference sample set is screened to obtain a second reference sample set, and then the number of available samples in the second neighbouring reference sample set is judged. When the number of the available samples in the first reference sample set or the second reference sample set is 0, the model parameter $\alpha$ is set to 0, the model parameter $\beta$ is set to the default value, and the prediction value corresponding to the chroma component is filled with the default value. When the number of the available samples in the first reference sample set or the second reference sample set is 2, the processing step is the same as the processing step when the number of the available samples is 0. Moreover, when the number of the available samples in the second reference sample set is 4, two samples having larger chroma component values and two samples having smaller chroma component values are obtained first through four comparisons, and then two average points are obtained. The model parameters $\alpha$ and $\beta$ are derived based on the two average points, and the prediction processing of the chroma component is performed according to the constructed prediction model. In this way, only the coding block in which the number of the available samples in the second reference sample set is 4 can perform the model parameter derivations in a CCLM mode. For the coding block in which the number of the available samples is less than 4, an approach of filling with a default value is directly used. Therefore, the computational complexity when the number of reference samples in the selection region is less than 4 can be reduced, and the coding and decoding performance can be maintained basically unchanged.

In the embodiments of this disclosure, the unification of the model parameter derivation processes is implemented. That is, for the number of the available samples, used for model parameter derivation, in the first reference sample set, when the number of the available samples in the first reference sample set is greater than or equal to the preset number, the available samples in the first reference sample set are screened to obtain the second reference sample set, and then the number of the available samples in the second neighbouring reference sample set is determined. When the number of the available samples in the second reference sample set meets the preset number, the current coding block requires the model parameter derivation under the CCLM mode and the step of constructing the prediction model. When the number of the available samples in the first reference sample set or the second reference sample set is less than the preset number, for the current coding block, the prediction value corresponding to the colour component to be predicted of the coding block may be filled with the default value. Therefore, the embodiments of this disclosure may further provide a simplified flow of model parameter derivation, as shown in FIG. 11.

Figure 11:
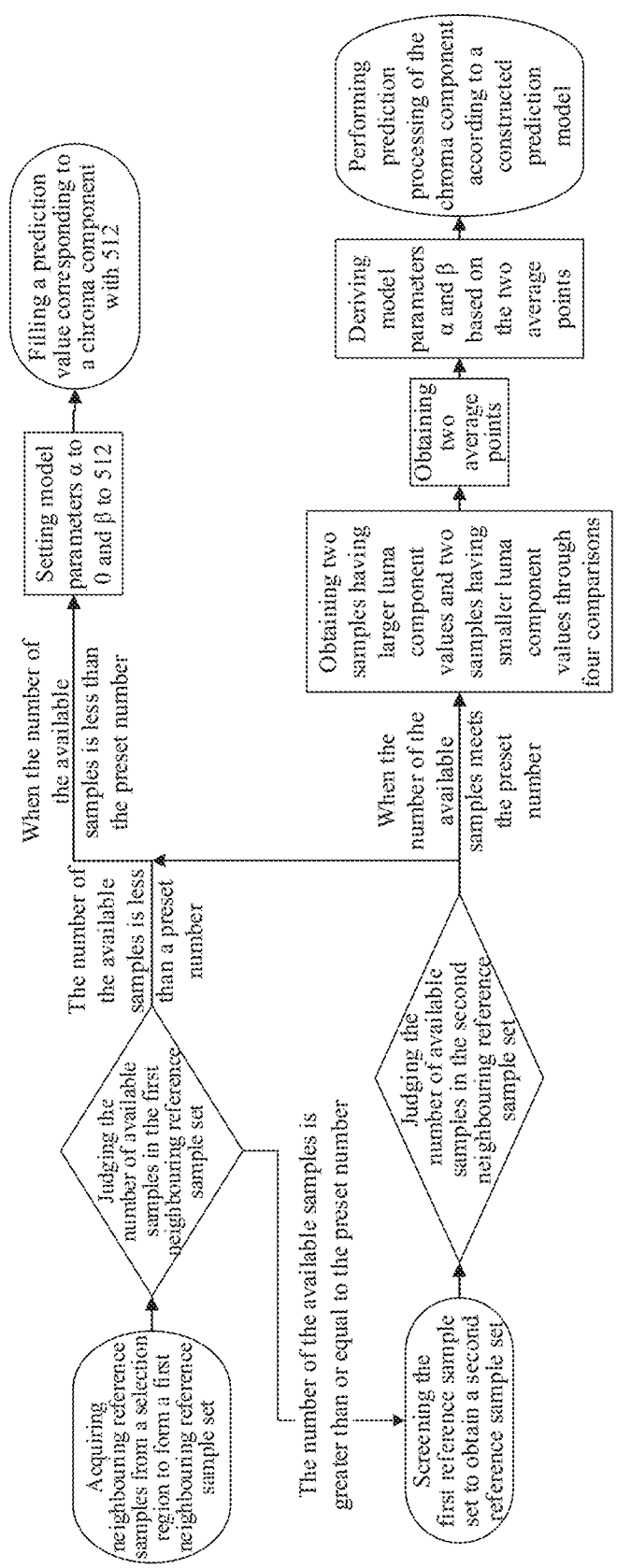
FIG. 11 is a simplified schematic flowchart of model parameter derivation according to an embodiment of this disclosure.

Compared with FIG. 10, the model parameter derivation process shown in FIG. 11 is leaner. In FIG. 11, assuming that the colour component to be predicted is a chroma component, and the preset component value is 512. Firstly, neighbouring reference samples are obtained from a selection region to form a first neighbouring reference sample set. Then, the number of available samples in the first neighbouring reference sample set is judged. When the number of the available samples in the first reference sample set is greater than or equal to the preset number, the first reference sample set is screened to obtain a second reference sample set, and then the number of available samples in the second neighbouring reference sample set is judged. When the number of the available samples in the first reference sample set or the second reference sample set is less than the preset number, the model parameter $\alpha$ is set to 0, the model parameter $\beta$ is set to 512, and the prediction value corresponding to the chroma component is filled with 512. When the number of the available samples in the second reference sample set meets the preset number, two samples having larger chroma component values and two samples having smaller chroma component values are obtained first through four comparisons, and then two average points are obtained. The model parameters $\alpha$ and $\beta$ are derived based on the two average points, and the prediction processing of the chroma component is performed according to the constructed prediction model. It is to be noted that only the coding block in which the number of the available samples in the second reference sample set meet the preset number can perform the model parameter derivation in the CCLM mode. For the coding block in which the number of the available samples is less than the preset number, an approach of filling with a default value is directly used. Therefore, the computational complexity when the number of reference samples in the selection region is less than the preset number can be reduced, and the coding and decoding performance can be maintained basically unchanged. Generally, the preset number in the embodiments of this disclosure may be 4.

Further, in the embodiments of this disclosure, the number of the available samples in the first reference sample set can be determined according to the number of available samples in the selection regions. Therefore, the embodiments of this disclosure may provide another simplified flow of model parameter derivation, as shown in FIG. 12.

Figure 12:
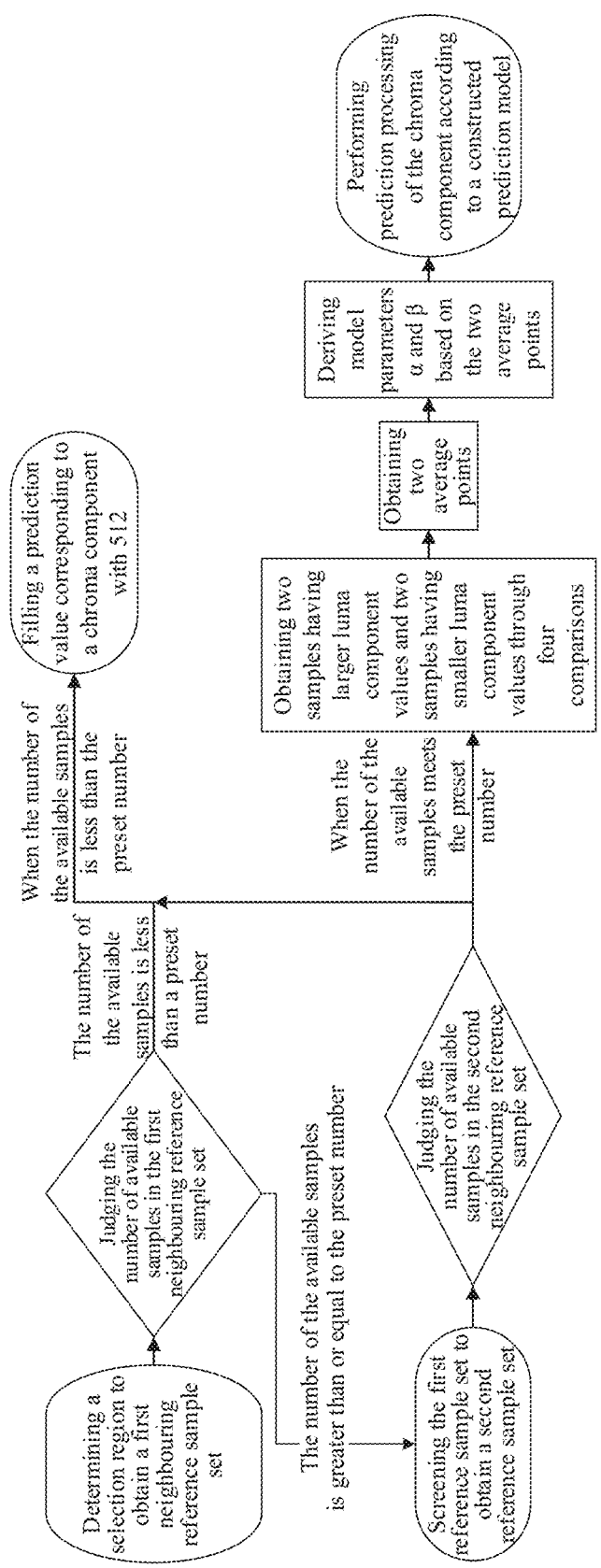
FIG. 12 is a simplified schematic flowchart of another model parameter derivation according to an embodiment of this disclosure.

In FIG. 12, assuming that the colour component to be predicted is a chroma component, and the preset component value is 512. Firstly, a selection region is determined so as to obtain a first reference sample set. Then, the number of available samples in the first reference sample set is determined. When the number of the available samples in the first reference sample set is greater than or equal to the preset number, the first reference sample set is screened to obtain a second reference sample set, and then the number of available samples in the second neighbouring reference sample set is determined. When the number of the available samples in the first reference sample set or the second reference sample set is less than the preset number, the prediction value corresponding to the chroma component is filled with 512. When the number of the available samples in the second reference sample set meets the preset number, two samples having larger chroma component values and two samples having smaller chroma component values are obtained first through four comparisons, and then two average points are obtained. The model parameters $\alpha$ and $\beta$ are derived based on the two average points, and the prediction processing of the chroma component is performed according to the constructed prediction model. In this way, only the coding block in which the number of the available samples in the second reference sample set meet the preset number can perform the model parameter derivation in the CCLM mode. For the coding block in which the number of the available samples is less than the preset number, an approach of filling with a default value is directly used. Therefore, the computational complexity when the number of reference samples in the selection region is less than the preset number can be reduced, and the coding and decoding performance can be maintained basically unchanged. Generally, the preset number in the embodiments of this disclosure may be 4.

Further, in some embodiments, VVC defines two variables, i.e., numSampL and numSampT. The variable numSampL represents the total number of the samples in the selection region H', and the variable numSampT represents the total number of the samples in the selection region W':

---
for the INTRA_LT_CCLM mode, numSampT=W and numSampL=H;
for the INTRA_L_CCLM mode, numSampT=0 and
numSampL=min {W+H,
H+H}; and
for the INTRA_T_CCLM mode, numSampT=min{W+H, W+W} and numSampL=0.
---

Besides, it is also necessary to consider the availableness of the selection regions (or neighbouring regions), that is, the variables numSampL and numSampT only represent the number of the available samples in the above-mentioned ranges.

In addition, VVC further defines that when the variables numSampL and numSampT are both 0 (in this case, the number of available samples that can be chosen for model parameter derivation is 0), the prediction value corresponding to the chroma component is directly set to the default value; otherwise, the model parameter derivation needs to be performed. The details are shown as follows.

---
If (numSampL==0 && numSampT==0)
    the prediction value corresponding to the chroma component
    is set to the default
    value;
    else
    the model parameter derivation is performed,
    and the chroma component is
    predicted by using the constructed prediction model so
    as to obtain the prediction value
    corresponding to the chroma component.
---

However, since the sum of numSampL and numSampT can represent the total number of the samples in the selection region, when numSampL+numSampT=0, zero available sample will be generated. When numSampL+numSampT=2, two available samples will be generated. When numSampL+numSampT≥4, four available samples will be generated. Therefore, the embodiments of this disclosure can be further expressed as follows (where the preset number may be 4).

---
If (numSampL+numSampT<the preset number)
    the prediction value corresponding to the chroma components
    is set to the default
    value;
    else
    the model parameter derivation is performed,
    and the chroma component is
    predicted by using the constructed prediction model so
    as to obtain the prediction value
    corresponding to the chroma component.
---

This embodiment provides a method for a colour component prediction. A first reference sample set corresponding to a colour component to be predicted of a coding block in a video picture is acquired; when the number of available samples in the first reference sample set is less than a preset number, a preset component value is taken as a prediction value corresponding to the colour component to be predicted; when the number of the available samples in the first reference sample set is greater than or equal to the preset number, the first reference sample set is screened to obtain a second reference sample set, where the number of available samples in the second reference sample set is less than or equal to the preset number; when the number of the available samples in the second reference sample set is less than the preset number, the preset component value is taken as the prediction value corresponding to the colour component to be predicted; and when the number of the available samples in the second reference sample set is equal to the preset number, a model parameter is determined through the second reference sample set, and a prediction model corresponding to the colour component to be predicted is obtained according to the model parameter, where the prediction model is used to implement prediction processing of the colour component to be predicted to obtain the prediction value corresponding to the colour component to be predicted. In this way, model parameter derivation processes are unified without changing the coding and decoding prediction performance. In addition, for the case where the number of available samples in the neighbouring reference sample set is less than the preset number, especially for a case where there is zero or two available samples, since no additional processing module is added, no additional processing is required, and the computational complexity is also reduced.

In another embodiment of this disclosure, for the case where the number of the available samples in the first reference sample set is less than the preset number, the CCLM mode may be directly disabled, and the preset component value is taken as the prediction value corresponding to the colour component to be predicted. Further, in some embodiments, after screening the first reference sample set to obtain the second reference sample set, the method may further include that:

when the number of the available samples in the first reference sample set is less than the preset number or the number of the available samples in the second reference sample set is less than the preset number, the preset component value is taken as the prediction value corresponding to the colour component to be predicted; and when the number of the available samples in the second reference sample set is greater than or equal to the preset number, a CCLM mode is used to implement the prediction processing of the colour component to be predicted.

It is to be noted that, for the case where the number of the available samples in the first reference sample set or the second reference sample set is less than the preset number, the CCLM mode can be disabled, for example, an identification of whether to use the CCLM mode is set to "disable the CCLM mode". In this case, the prediction value corresponding to the colour component to be predicted is directly filled with the default value. Only when the number of the available samples in the second reference sample set is greater than or equal to the preset number, the CCLM mode can be used, for example, the identification of whether to use the CCLM mode is set to "enable the CCLM mode". In this case, the prediction processing of the colour component to be predicted can be implemented through the CCLM mode.

It is also to be noted that assuming that the colour component to be predicted is a chroma component, and the preset number is 4, for all cases where two available samples may be generated (where the judgment approach for generating two available samples is not specifically limited in the embodiments of this disclosure), the model parameter $\alpha$ may also be set to 0, and the model parameter $\beta$ may also set to an intermediate value (also referred to as a default value) corresponding to the chroma component. Therefore, the prediction values corresponding to the chroma components of all samples in the coding block can be filled with the default value. Furthermore, for all the cases where two available samples may be generated, both numSampL and numSampT can also be set to 0, and therefore, the prediction values corresponding to the chroma components of all the samples in the coding block can be filled with the default value.

In addition, for all the cases where two available samples may be generated, the prediction values corresponding to the chroma components can be directly filled with the default value. Alternatively, for all the cases where two available samples may be generated, the CCLM mode can be disabled. Alternatively, for all cases where two or zero available sample may be generated, the CCLM mode can be disabled. Alternatively, for all the cases where two or zero available sample may be generated, the prediction values corresponding to the chroma components can be directly filled with the default value.

In this way, in a case where the number of available samples used for the model parameter derivation is different, the unification of the model parameter derivation processes is implemented. Specifically, when the number of the available samples is 2, no additional processing is required, the existing processing module is directly invoked (i.e., the processing when the number of the available samples is 2 is aligned with the processing when the number of the available samples is 0), thereby reducing the computational complexity.

According to the method for the colour component prediction in the embodiments of this disclosure, based on the latest VVC reference software VTM5.0, in All intra conditions, for a test sequence required by JVET, according to general test conditions, BD-rate average changes in a Y component, a Cb component and a Cr component are 0.00%, 0.02%, and 0.02%, respectively, which indicate that this disclosure has little impact on the coding and decoding performance.

Without affecting the coding and decoding performance, this disclosure may achieve the following beneficial effects.

Firstly, the model parameter derivation processes in the CCLM can be unified in this disclosure. In the solutions of the prior art, for the case where the number of the available samples is 2, an additional "copy" operation needs to be performed to generate four available samples, so that the same operations as in the case of four available samples can be performed to complete the model parameter derivation. However, in this disclosure, the additional "copy" operation can be eliminated, and the processing when the number of the available samples is 2 is aligned with the processing when the number of the available samples is 0. In this case, the same processing module can be directly used without adding an additional operation, so that the unification of the linear model parameter derivation processes can be implemented.

Secondly, this disclosure can also reduce the computational complexity when there are two available samples used for model parameter derivation in the CCLM mode. In the solutions of the prior art, for the case where the number of the available samples is 2, not only an additional "copy" operation needs to be performed to generate four available samples, but also the same operations as in the case of four available samples, i.e., a series of operations such as four comparisons, four averaging calculations, model parameter calculation, and prediction model construction, need to be executed. However, this disclosure can eliminate these operations and directly fill all the prediction values $Pred_C[i, j]$ corresponding to the chroma components of all samples in the current coding block with the preset component value, i.e., the default value of the chroma components, without affecting the coding and decoding performance.

This embodiment provides a method for a colour component prediction. Through the technical solution of this embodiment, the number of available samples in a first reference sample set is compared with a preset number. When the number of the available samples in the first reference sample set or a second reference sample set is less than the preset number, a preset default value is directly taken as a prediction value corresponding to a colour component to be predicted. Only when the number of the available samples in the second reference sample set is greater than or equal to the preset number, model parameters are determined according to the first reference sample set so as to construct a prediction model of the colour component to be predicted, thereby unifying model parameter derivation processes. In addition, for the case where the number of the available samples in the first reference sample set is less than the preset number, since no additional processing module is added, the computational complexity is also reduced.

Figure 13:
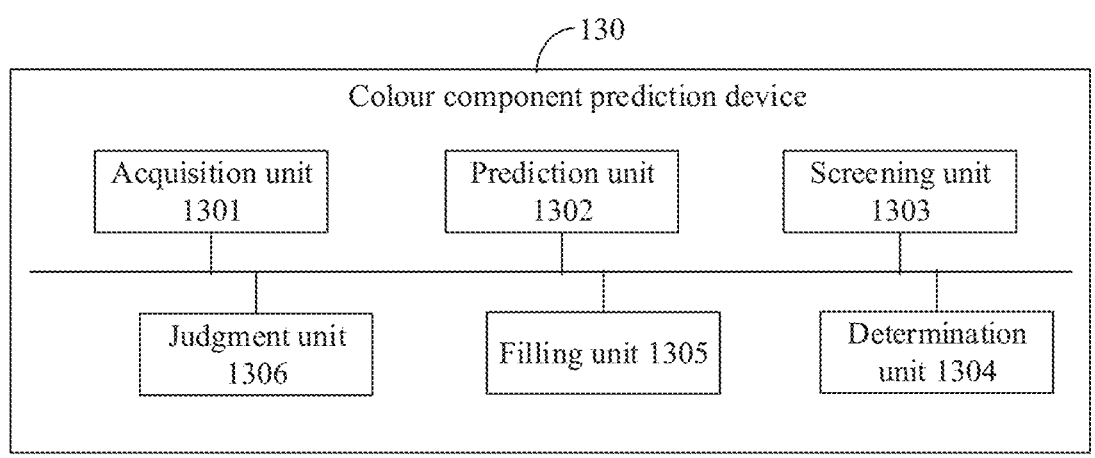
FIG. 13 is a schematic structural composition diagram of a colour component prediction device according to an embodiment of this disclosure.

Based on the same inventive concept as the foregoing embodiments, referring to FIG. 13, FIG. 13 is a schematic structural composition diagram of a colour component prediction device 130 according to an embodiment of this disclosure. The colour component prediction device 130 may include an acquisition unit 1301, a prediction unit 1302, and a screening unit 1303.

The acquisition unit 1301 is configured to acquire a first reference sample set corresponding to a colour component to be predicted of a coding block in a video picture.

The prediction unit 1302 is configured to take, when the number of available samples in the first reference sample set is less than a preset number, a preset component value as a prediction value corresponding to the colour component to be predicted.

The screening unit 1303 is configured to screen, when the number of the available samples in the first reference sample set is greater than or equal to the preset number, the first reference sample set to obtain a second reference sample set. The number of available samples in the second reference sample set is less than or equal to the preset number.

The prediction unit 1302 is further configured to: when the number of the available samples in the second reference sample set is less than the preset number, take the preset component value as the prediction value corresponding to the colour component to be predicted; and when the number of the available samples in the second reference sample set is equal to the preset number, determine a model parameter through the second reference sample set, and obtain a prediction model corresponding to the colour component to be predicted according to the model parameter. The prediction model is used to implement prediction processing of the colour component to be predicted to obtain the prediction value corresponding to the colour component to be predicted.

In the foregoing solution, the acquisition unit 1301 is specifically configured to: acquire reference samples neighboring at least one side of the coding block, where the at least one side includes a left side of the coding block and/or a top side of the coding block; and form the first reference sample set corresponding to the colour component to be predicted based on the reference samples.

In the foregoing solution, the acquisition unit 1301 is specifically configured to: acquire reference samples in a reference row or a reference column neighboring the coding block, where the reference row includes a row neighboring a top side and a top-right side of the coding block, and the reference column includes a column neighboring a left side and a bottom-left side of the coding block; and based on the reference samples, form the first reference sample set corresponding to the colour component to be predicted.

In the foregoing solution, the screening unit 1303 is specifically configured to: based on sample positions and colour component strengths corresponding to neighbouring reference samples in the first reference sample set, determine positions of samples to be selected; and according to the determined positions of samples to be selected, choose, from the first reference sample set, available samples corresponding to the positions of the sample to be selected, and combine the chosen available samples into the second reference sample set. The number of the available samples in the second reference sample set is less than or equal to the preset number.

In the foregoing solution, referring to FIG. 13, the colour component prediction device 130 may further include a determination unit 1304, which is configured to: based on bit information of the video picture, determine a preset component range corresponding to the colour component to be predicted; and determine an intermediate value of the preset component range according to the preset component range, and take the intermediate value as the prediction value corresponding to the colour component to be predicted. The intermediate value is expressed as the preset component value.

In the foregoing solution, referring to FIG. 13, the colour component prediction device 130 may further include a filling unit 1305, which is configured to, for each sample in the coding block, the preset component value to perform prediction value filling on the colour component to be predicted of each sample.

In the foregoing solution, the prediction unit 1302 is further configured to perform prediction processing on the colour component to be predicted of each sample in the coding block based on the prediction model, to obtain the prediction value corresponding to the colour component to be predicted of each sample.

In the foregoing solution, the value of the preset number is 4. The prediction unit 1302 is further configured to take, when the number of the available samples in the first reference sample set is 0 or 2, the preset component value as the prediction value corresponding to the colour component to be predicted.

Accordingly, the prediction unit 1302 is further configured to take, when the number of the available samples in the second reference sample set is 0 or 2, the preset component value as the prediction value corresponding to the colour component to be predicted.

In the foregoing solution, referring to FIG. 13, the colour component prediction device 130 may further include a judgment unit 1306, which is configured to: when the number of the available samples in the first reference sample set is less than the preset number or the number of the available samples in the second reference sample set is less than the preset number, take the preset component value as the prediction value corresponding to the colour component to be predicted; and when the number of the available samples in the second reference sample set is greater than or equal to the preset number, use a CCLM mode to implement the prediction processing of the colour component to be predicted.

It is to be understood that in this embodiment, a "unit" may be a part of a circuit, a part of a processor, a part of a program or software, etc., and certainly, it may also be a module, or it may be non-modular. Moreover, the components in this embodiment may be integrated into one processing unit, or each of the units may exist alone physically, or two or more units may be integrated into one unit. The integrated unit may be implemented in the form of hardware, or may be implemented in a form of a software functional module.

When being realized in form of software functional unit and sold or used as an independent product, the integrated unit may also be stored in a computer-readable storage medium. Based on such an understanding, the technical solutions of this disclosure substantially or parts making contributions to the conventional art or part of the technical solutions may be embodied in form of software product, and the computer software product is stored in a storage medium, including multiple instructions configured to enable a computer device (which may be a personal computer, a server, a network device or the like) or a processor to execute all or part of the steps of the method in each embodiment of the application. The foregoing storage medium includes: various media capable of storing program codes such as a U disk, a mobile hard disk, a Read Only Memory (ROM), a Random Access Memory (RAM), a magnetic disk, or an optical disk.

Therefore, this embodiment provides a computer storage medium, having a colour component prediction program stored thereon. The colour component prediction program implements the steps of the method according to any one of the foregoing embodiments when executed by at least one processor.

Figure 14:
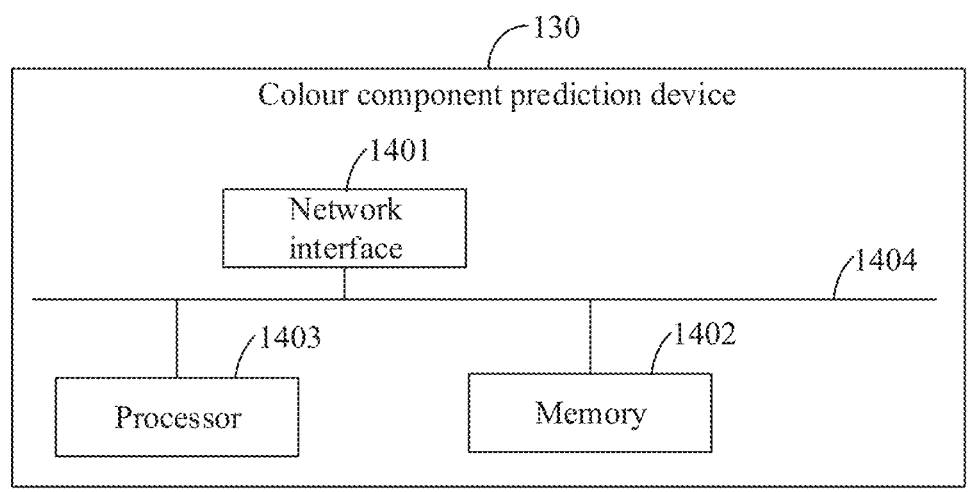
FIG. 14 is a schematic structural diagram of specific hardware of a colour component prediction device according to an embodiment of this disclosure.

Based on the components of the foregoing colour component prediction device 130 and the computer storage medium, referring to FIG. 14, the specific hardware structure of the colour component prediction device 130 provided by the embodiments of this disclosure shown therein may include a network interface 1401, a memory 1402, and a processor 1403. The components are coupled together through a bus system 1404. It is to be understood that the bus system 1404 is configured to implement connection and communication between the components. In addition to a data bus, the bus system 1404 further includes a power bus, a control bus, and a status signal bus. However, for ease of clear description, all types of buses are marked as the bus system 1404 in FIG. 14. The network interface 1401 is configured to receive and send a signal during a process of receiving or sending information from or to other external network elements.

The memory 1402 is configured to store a computer program capable of running on the processor 1403.

The processor 1403 is configured to execute, when running the computer program, the following operations:

acquiring a first reference sample set corresponding to a colour component to be predicted of a coding block in a video picture;

when the number of available samples in the first reference sample set is less than a preset number, taking a preset component value as a prediction value corresponding to the colour component to be predicted;

when the number of the available samples in the first reference sample set is greater than or equal to the preset number, screening the first reference sample set to obtain a second reference sample set, where the number of available samples in the second reference sample set is less than or equal to the preset number;

when the number of the available samples in the second reference sample set is less than the preset number, taking the preset component value as the prediction value corresponding to the colour component to be predicted; and when the number of the available samples in the second reference sample set is equal to the preset number, determining a model parameter through the second reference sample set, and obtaining a prediction model corresponding to the colour component to be predicted according to the model parameter, where the prediction model is used to implement prediction processing of the colour component to be predicted to obtain the prediction value corresponding to the colour component to be predicted.

It is to be understood that the memory 1402 in the embodiments of this disclosure may be a volatile memory or a non-volatile memory, or may include both a volatile memory and a non-volatile memory. The non-volatile memory may be a Read-Only Memory (ROM), a Programmable ROM (PROM), an Erasable PROM (EPROM), an electrically programmable ROM (EPROM), an Electrically EPROM (EEPROM), or a flash memory. The volatile memory may be a Random Access Memory (RAM), which is used as an external cache. By way of exemplary rather than restrictive description, RAMs in many forms may be used, such as a Static RAM (SRAM), a Dynamic RAM (DRAM), a Synchronous DRAM (SDRAM), a Double Data Rate SDRAM (DDRSDRAM), an Enhanced SDRAM (ESDRAM), a Synchlink DRAM (SLDRAM), and a Direct Rambus RAM (DRRAM). The memory 1402 in a system and the method that are described therein is intended to include, but is not limited to, these memories and any other proper types of memories.

The processor 1403 may be an integrated circuit chip having a signal processing capability. In an implementation process, the steps in the foregoing method may be completed by using a hardware integrated logic circuit in the processor 1403, or by using instructions in the form of software. The processor 1403 may be a general-purpose, a Digital Signal Processor (DSP), an Application Specific Integrated Circuit (ASIC), a Field Programmable Gate Array (FPGA) or another programmable logic device, a discrete gate or a transistor logic device, or a discrete hardware component. All the methods, steps, and logical block diagrams disclosed in the embodiments of this disclosure may be implemented or performed. The general purpose processor may be a microprocessor or the processor may also be any conventional processor, or the like. The steps of the methods disclosed in the embodiments of this disclosure may be directly completed by a hardware decoding processor, or may be completed by using a combination of hardware in a decoding processor and a software module. The software module may be located in a mature storage medium in the art, such as a RAM, a flash memory, a ROM, a PROM, an EEPROM, or a register. The storage medium is located in the memory 1402, and the processor 1403 reads information in the memory 1402 and completes the steps in the methods in combination with hardware thereof.

It is to be understood that these embodiments described therein may be implemented by using hardware, software, firmware, middleware, microcode, or any combination thereof. For hardware implementation, the processing unit may be implemented in one or more Application Specific Integrated Circuits (ASICs), DSPs, DSP Devices (DSPDs), Programmable Logic Devices (PLDs), Field-Programmable Gate Arrays (FPGAs), general-purpose processors, controllers, microcontrollers, microprocessors, other electronic units configured to execute the foregoing functions of this disclosure or the combination thereof.

For software implementation, the technologies set forth herein may be implemented by using modules (such as processes and functions) for executing the functions set forth therein. Software codes may be stored in a memory and executed by a processor. The memory may be implemented in the processor or outside the processor.

Optionally, as another embodiment, the processor 1403 is further configured to execute, when running the computer program, the method according to any one of the foregoing embodiments.

Figure 15:
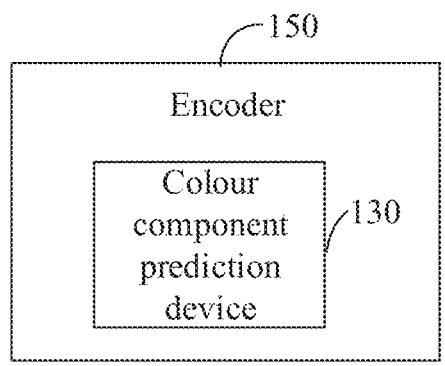
FIG. 15 is a schematic structural composition diagram of an encoder according to an embodiment of this disclosure.

Referring to FIG. 15, FIG. 15 is a schematic structural composition diagram of an encoder according to an embodiment of this disclosure. As shown in FIG. 15, the encoder 150 may at least include the colour component prediction device 130 according to any one of the foregoing embodiments.

Figure 16:
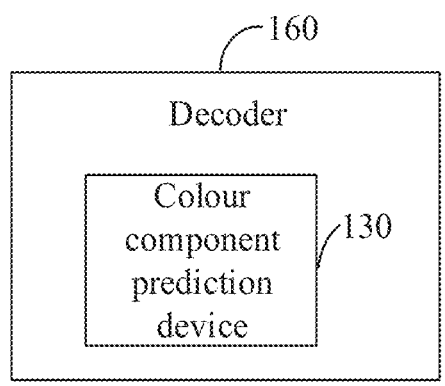
FIG. 16 is a schematic structural composition diagram of a decoder according to an embodiment of this disclosure.

Referring to FIG. 16, FIG. 16 is a schematic structural composition diagram of a decoder according to an embodiment of this disclosure. As shown in FIG. 16, the decoder 160 may at least include the colour component prediction device 130 according to any one of the foregoing embodiments.

It is to be noted that, in this disclosure, the terms "comprise", "include" or any other variations are intended to cover non-exclusively including so that any process, method, article or device that includes a series of elements includes not only such elements, but also include other elements that are not explicitly listed, or also includes intrinsic elements of such process, method, article or device. Without more limitations, elements defined by the phrase "include a . . . " do not rule out that there are other same elements in the process, method, article or device which include said elements.

The sequence numbers of the foregoing embodiments of this disclosure are merely for description purpose but do not imply the preference among the embodiments.

The methods disclosed in the several method embodiments provided in this disclosure can be combined arbitrarily without conflicts to obtain new method embodiments.

The features disclosed in the several product embodiments provided in this disclosure can be combined arbitrarily without conflicts to obtain new product embodiments.

The features disclosed in the several method or device embodiments provided in this disclosure can be combined arbitrarily without conflicts to obtain new method embodiments or device embodiments.

The above is only the specific implementation mode of this disclosure and not intended to limit the scope of protection of this disclosure. Any variations or replacements apparent to those skilled in the art within the technical scope disclosed by this disclosure shall fall within the scope of protection of this disclosure. Therefore, the scope of protection of this disclosure shall be subject to the scope of protection of the claims.

INDUSTRIAL APPLICABILITY

In the embodiments of this disclosure, a first reference sample set corresponding to a colour component to be predicted of a coding block in a video picture is acquired; when the number of available samples in the first reference sample set is less than a preset number, a preset component value is taken as a prediction value corresponding to the colour component to be predicted; when the number of the available samples in the first reference sample set is greater than or equal to the preset number, the first reference sample set is screened to obtain a second reference sample set, where the number of available samples in the second reference sample set is less than or equal to the preset number; when the number of the available samples in the second reference sample set is less than the preset number, the preset component value is taken as the prediction value corresponding to the colour component to be predicted; and when the number of the available samples in the second reference sample set is equal to the preset number, a model parameter is determined through the second reference sample set, and according to the model parameter, a prediction model corresponding to the colour component to be predicted is obtained, where the prediction model is used to implement prediction processing of the colour component to be predicted to obtain the prediction value corresponding to the colour component to be predicted. In this way, when the number of the available samples in the first reference sample set is less than the preset number or the number of the available samples in the second reference sample set is less than the preset number, a preset default value is directly taken as the prediction value corresponding to the colour component to be predicted. Only when the number of the available samples in the second reference sample set meets the preset number, the model parameter is determined according to the first reference sample set to establish the prediction model for the colour component to be predicted, thereby unifying model parameter derivation processes. Moreover, for the case where the number of the available samples in the first reference sample set or the second reference sample set is less than the preset number, especially for the case where there is zero or two available samples, since no additional processing module is added, the preset default value is directly taken as the prediction value corresponding to the colour component to be predicted, so that no additional processing is required, and the computational complexity is also reduced.

The invention claimed is:

1. A method for a colour component prediction, applied to decoder, comprising:
    determining a first reference sample set corresponding to a colour component to be predicted of a coding block in a video picture;
    when a number of available samples in the first reference sample set is equal to 0, taking a preset component value as a prediction value corresponding to the colour component to be predicted; and
    when the number of the available samples in the first reference sample set is greater than or equal to 4, obtaining a second reference sample set based on the first reference sample set;
    when a number of available samples in the second reference sample set is equal to 2, taking the preset component value as the prediction value corresponding to the colour component to be predicted; and
    when the number of available samples in the second reference sample set is equal to 4, determining a model parameter of a prediction model according to the second reference sample set, wherein the prediction model is used to implement a prediction processing of the colour component to be predicted to obtain a prediction value corresponding to the colour component to be predicted.

2. The method of claim 1, wherein the determining the first reference sample set corresponding to the colour component to be predicted of the coding block in the video picture comprises:
    acquiring reference samples neighboring at least one side of the coding block, wherein the at least one side comprises at least one of a left side of the coding block or a top side of the coding block; and
    determining the first reference sample set corresponding to the colour component to be predicted based on the reference samples.

3. The method of claim 1, wherein the determining the first reference sample set corresponding to the colour component to be predicted of the coding block in the video picture comprises:
    acquiring reference samples in at least one of a reference row or a reference column neighboring the coding block, wherein the reference row comprises a row neighboring a top side and a top-right side of the coding block, and the reference column comprises a column neighboring a left side and a bottom-left side of the coding block; and
    determining the first reference sample set corresponding to the colour component to be predicted based on the reference samples.

4. The method of claim 1, wherein obtaining the second reference sample set based on the first reference sample set comprises:
    determining positions of samples to be selected based on at least one of sample positions or colour component strength corresponding to neighbouring reference samples in the first reference sample set; and
    determining, from the first reference sample set, available samples corresponding to the positions of the samples to be selected according to the determined positions of the samples to be selected, and determining the second reference sample set based on the determined available samples, wherein the number of the available samples in the second reference sample set is less than or equal to 4.

5. The method of claim 1, wherein the taking the preset component value as the prediction value corresponding to the colour component to be predicted comprises:
    determining the preset component value based on a bit depth of the video picture;
    wherein the preset component value is $1<<(BitDepth-1)$, and the BitDepth is a bit depth of the colour component to be predicted.

6. The method of claim 1, wherein the method further comprises:
    for each sample in the coding block, performing prediction value filling on the colour component to be predicted of each sample by using the preset component value.

7. The method of claim 1, wherein after obtaining the prediction model corresponding to the colour component to be predicted according to the model parameter, the method further comprises:

performing a prediction processing on the colour component to be predicted of each sample in the coding block based on the prediction model, to obtain a prediction value corresponding to a colour component to be predicted of each sample.

8. A method for a colour component prediction, applied to encoder, comprising:

determining a first reference sample set corresponding to a colour component to be predicted of a coding block in a video picture;

when a number of available samples in the first reference sample set is equal to 0, taking a preset component value as a prediction value corresponding to the colour component to be predicted; and when the number of the available samples in the first reference sample set is greater than or equal to 4, obtaining a second reference sample set based on the first reference sample set:

when a number of available samples in the second reference sample set is equal to 2, taking the preset component value as the prediction value corresponding to the colour component to be predicted; and when the number of available samples in the second reference sample set is equal to 4, determining a model parameter of a prediction model according to the second reference sample set, wherein the prediction model is used to implement a prediction processing of the colour component to be predicted to obtain a prediction value corresponding to the colour component to be predicted.

9. The method of claim 8, wherein the determining the first reference sample set corresponding to the colour component to be predicted of the coding block in the video picture comprises:

acquiring reference samples neighboring at least one side of the coding block, wherein the at least one side comprises at least one of a left side of the coding block or a top side of the coding block; and determining the first reference sample set corresponding to the colour component to be predicted based on the reference samples.

10. The method of claim 8, wherein the determining the first reference sample set corresponding to the colour component to be predicted of the coding block in the video picture comprises:

acquiring reference samples in at least one of a reference row or a reference column neighboring the coding block, wherein the reference row comprises a row neighboring a top side and a top-right side of the coding block, and the reference column comprises a column neighboring a left side and a bottom-left side of the coding block; and determining the first reference sample set corresponding to the colour component to be predicted based on the reference samples.

11. The method of claim 8, wherein obtaining the second reference sample set based on the first reference sample set comprises:

determining positions of samples to be selected based on at least one of sample positions or colour component strength corresponding to neighbouring reference samples in the first reference sample set; and determining, from the first reference sample set, available samples corresponding to the positions of the samples to be selected according to the determined positions of the samples to be selected, and determining the second reference sample set based on the determined available samples, wherein the number of the available samples in the second reference sample set is less than or equal to 4.

12. The method of claim 8, wherein the taking the preset component value as the prediction value corresponding to the colour component to be predicted comprises:

determining the preset component value based on a bit depth of the video picture;

wherein the preset component value is 1<<(BitDepth−1), and the BitDepth is a bit depth of the colour component to be predicted.

13. The method of claim 8, wherein the method further comprises:

for each sample in the coding block, performing prediction value filling on the colour component to be predicted of each sample by using the preset component value.

14. The method of claim 8, wherein after obtaining the prediction model corresponding to the colour component to be predicted according to the model parameter, the method further comprises:

performing a prediction processing on the colour component to be predicted of each sample in the coding block based on the prediction model, to obtain a prediction value corresponding to a colour component to be predicted of each sample.

15. A decoder, comprising a processor and a memory configured to store a computer program capable of running on the processor, wherein the processor is configured to:

determine a first reference sample set corresponding to a colour component to be predicted of a coding block in a video picture;

when a number of available samples in the first reference sample set is equal to 0, take a preset component value as a prediction value corresponding to the colour component to be predicted;

when the number of the available samples in the first reference sample set is greater than or equal to 4, obtain a second reference sample set based on the first reference sample set:

when a number of available samples in the second reference sample set is equal to 2, taking the preset component value as the prediction value corresponding to the colour component to be predicted; and when the number of available samples in the second reference sample set is equal to 4, determine a model parameter of a prediction model according to the second reference sample set, wherein the prediction model is used to implement a prediction processing of the colour component to be predicted to obtain a prediction value corresponding to the colour component to be predicted.

16. The decoder of claim 15, wherein the processor is further configured to:

acquire reference samples neighboring at least one side of the coding block, wherein the at least one side comprises at least one of a left side of the coding block or a top side of the coding block; and determine the first reference sample set corresponding to the colour component to be predicted based on the reference samples.

17. The decoder of claim 15, wherein the processor is further configured to:
- acquire reference samples in at least one of a reference row or a reference column neighboring the coding block, wherein the reference row comprises a row neighboring a top side and a top-right side of the coding block, and the reference column comprises a column neighboring a left side and a bottom-left side of the coding block; and
- determine the first reference sample set corresponding to the colour component to be predicted based on the reference samples.

18. The decoder of claim 15, wherein the processor is further configured to:
- determine positions of samples to be selected based on at least one of sample positions or colour component strength corresponding to neighbouring reference samples in the first reference sample set; and
- determine, from the first reference sample set, available samples corresponding to the positions of the samples to be selected according to the determined positions of the samples to be selected, and determine the second reference sample set based on the determined available samples, wherein the number of the available samples in the second reference sample set is less than or equal to 4.

19. The decoder of claim 15, wherein the processor is further configured to:
- determine the preset component value based on a bit depth of the video picture;
- wherein the preset component value is 1<<(BitDepth−1), and the BitDepth is a bit depth of the colour component to be predicted.

20. A non-transitory computer-readable storage medium, having a computer program and a bitstream stored thereon, wherein the computer program, when executed by a processor, enables the processor to perform the steps of the method for the colour component prediction of claim 8 to generate the bitstream.

* * * * *